(12) United States Patent
Henne et al.

(10) Patent No.: US 7,634,941 B2
(45) Date of Patent: Dec. 22, 2009

(54) SUB-SCALE SONIC BOOM MODELING

(75) Inventors: Preston A. Henne, Hilton Head Island, SC (US); Donald C. Howe, Savannah, GA (US); Robert R. Wolz, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 169 days.

(21) Appl. No.: 12/010,042

(22) Filed: Jan. 18, 2008

(65) Prior Publication Data

US 2009/0183560 A1    Jul. 23, 2009

(51) Int. Cl.
*G01M 9/00*    (2006.01)
(52) U.S. Cl. ......................................................... 73/147
(58) Field of Classification Search ............... 73/112.01, 73/112.03, 112.04, 147, 865.6
See application file for complete search history.

(56) References Cited

U.S. PATENT DOCUMENTS

| | | | |
|---|---|---|---|
| 6,698,684 B1 | 3/2004 | Henne et al. | |
| 6,854,687 B1 | 2/2005 | Morgenstern et al. | |
| 6,905,091 B2 * | 6/2005 | Berson et al. | 244/1 N |
| 7,252,263 B1 * | 8/2007 | Hagemeister et al. | 244/1 R |
| 2005/0098681 A1 * | 5/2005 | Berson et al. | 244/1 N |

* cited by examiner

*Primary Examiner*—Eric S McCall
(74) *Attorney, Agent, or Firm*—Kaye Scholer LLP

(57) ABSTRACT

A method for modeling the acoustic signature produced by an aircraft of interest flying at a particular supersonic Mach number/altitude operating point of interest. The method includes operating a sub-scale aircraft that is a sub-scale version of the aircraft of interest at a supersonic Mach number and at an altitude that are respectively different from the Mach number and the altitude associated with the operating point of interest. The Mach number and altitude at which the sub-scale aircraft is operated is selected such that peak overpressure generated by the sub-scale aircraft and time to rise to peak overpressure are the same as peak overpressure and time to rise to peak overpressure caused by operating the aircraft of interest at the operating point of interest.

9 Claims, 22 Drawing Sheets

SUB-SCALE SONIC BOOM MODELING

FIELD OF THE INVENTION

In general, the invention relates to modeling the performance of aircraft. More particularly, the invention relates to modeling the acoustic signature of supersonic aircraft using sub-scale models.

BACKGROUND OF THE INVENTION

Various aircraft manufacturers have been and continue to be interested in producing supersonic aircraft for general civil use in the United States and elsewhere. Current regulations, however, prohibit at least supersonic flight over the continental United States and many other countries due to the presently objectionable nature of sonic booms. Therefore, before supersonic civil aviation becomes permissible, the sonic characteristics (i.e., the acoustic signatures) of aircraft must be modified and demonstrated to be generally acceptable.

In this regard, it is known that the N-shaped acoustic signature of a supersonic aircraft can be shaped or modified by various means to quiet the boom or otherwise render it less objectionable. See, for example, PCT Publication Number WO 03/064254 (PCT Application Number PCT/US03/0263 1) published Aug. 7, 2003, the contents of which are incorporated by reference.

Furthermore, generating a statistically meaningful database of sonic boom information in order to demonstrate the tolerable nature of modified acoustic signatures is considered to be an important step in establishing new, rational rules for acceptable supersonic flight over land. In order to generate such a statistically meaningful database, actual flight test data is required.

Ideally, flight test data would be generated using a full-scale test vehicle that duplicates exactly the aerodynamics of a future supersonic aircraft. The cost of designing, building, and operating a vehicle, and hence the cost of obtaining such flight test data, however, increases significantly with the size of the vehicle; therefore, it is desirable to generate flight test data using sub-scale aircraft. However, if a given sub-scale aircraft is simply flown at the same design point (altitude and speed) as the aircraft of which it is a model, the acoustic signature of the sub-scale aircraft will not match that of the design (full-scale) aircraft, and the data generated using the sub-scale aircraft will be of little value. Therefore, certain accommodations have to be made in order for the acoustic signature of the sub-scale aircraft to match the acoustic characteristics of the larger vehicle.

Sonic Boom Shaping

In general, a normal sonic boom is characterized by a pressure disturbance or "signature" at the ground which has an initial abrupt pressure rise (the bow shock), a gradual expansion to below ambient pressure, and then a second abrupt pressure rise (the tail shock) back to ambient. It is the two abrupt pressure rises—the bow shock and the tail shock—which an observer on the ground perceives as the classical two-pulse sonic boom: "boom-boom".

When pressure deviation from ambient ($\Delta P$) is plotted as a function of either distance or time, the plot has the shape of a capital "N." The magnitude of the pressure rise is a function of the vehicle weight, its length, altitude, and speed of flight (Mach number). The duration of the boom ($\Delta T$, i.e., the time interval between the bow and tail shocks) is primarily a function of the vehicle length, flight speed, and altitude, although vehicle shaping also has an effect on boom characteristics.

A typical N-wave sonic boom is plotted in FIG. 1, which illustrates three parameters associated with a given N-wave: the initial bow shock pressure rise ($\Delta P_{bow}$), the boom duration ($\Delta T$), and the final tail shock pressure rise back to ambient ($\Delta P_{tail}$). In general, the pressure signature can be plotted as a function of either time or distance, and in qualitative terms the plots will appear similar. In many cases, it does not matter which independent variable is used. However, when evaluating and comparing the acoustic characteristics of sonic signatures, it is important that they be compared as functions of time, since it is pressure fluctuations over time that is perceived by the human ear.

As exemplified by FIG. 1, a typical N-wave has a duration $\Delta T$ of one to two tenths of a second, although longer or shorter booms can also occur. If the time $\Delta T$ between the bow and tail shocks is less than about 50 milliseconds ($\frac{1}{20}$ of a second), the human ear can not distinguish the two distinct pressure rises and the boom will be heard as a single sound. If, on the other hand, $\Delta T$ is longer than about 50 milliseconds, the boom will be heard as two sharp and distinct sounds (although atmospheric turbulence, ground and building reflections, and other factors can vary that perception).

FIGS. 2 and 3 are examples of typical sonic booms measured from overflights of actual aircraft. FIG. 2 is the boom signature from an F-15 fighter and FIG. 3 is the boom signature from a much larger aircraft, namely, the 1960's XB-70 experimental supersonic bomber. Although both booms show minor deviations from the "clean" N-wave shape of FIG. 1, both are still clearly classic N-waves, with abrupt bow shocks to peak overpressure, linear expansion, and second abrupt tail shocks back to ambient.

As noted above, it is known that the N-shaped acoustic signature of a supersonic aircraft can be shaped or modified by various means in order to reduce the noise level and annoyance of sonic booms created by the aircraft. In this regard, it is possible to make two changes to the typical signature. First, the magnitude of the overpressure $\Delta P$ can be reduced, as the noise level is in part directly related to the overpressure level. Second, the abruptness of the pressure rise can be reduced.

One way to reduce the abruptness of the pressure rise is to "replace" the single strong shock with a series of weak shocks with discrete time intervals between them, as is known in the art. A typical shaped boom signature of this type is plotted in FIG. 4, where it can be seen that the interval $\Delta T_{rise}$ over which the pressure rises to peak overpressure $\Delta P_{peak}$ is a much longer period of time, e.g., as much as a third of the total signature duration. Even with the same peak overpressure $\Delta P_{peak}$, a shaped boom of this type will have a very different sound characteristic than a classic N-wave boom will have. In particular, while the abrupt pressure rise of a classic N-wave boom will be heard as a very sharp crack that startles the observer and is responsible for much of the objectionable aspects of the boom, a shaped signature with extended rise time, e.g., as shown in FIG. 4, will be heard as more of a rumble (like distant thunder) than a sharp crack. Thus, although the observer will still hear a shaped boom, it will not be as startling and objectionable as a classic N-wave boom.

It should be appreciated that shaping of the tail shock is also an important aspect that can be manipulated in order to eliminate the objectionable aspects of sonic boom, although it has not received as much attention and research as has shaping the bow shock.

Operating Point Adjustment for Acoustic Matching

As noted above, if a given sub-scale aircraft is simply flown at the same design point (altitude and speed) as the aircraft of which it is a model, the acoustic signature of the sub-scale aircraft will not match that of the full-scale aircraft, and the data generated using the sub-scale aircraft will be of little value. More particularly, in that case, a sub-scale demonstrator will produce a boom signature with a shorter duration and weaker shocks than the full-scale aircraft's boom signature under like conditions.

This is illustrated in FIG. 5, where the ground signatures of full-scale and 75% scale low-boom vehicles, flown at the same flight condition, are compared. (In this and all subsequent examples, the boom signatures and the values of their various associated metrics or parameters have been generated computationally based on an equivalent area distribution representing a low boom supersonic business jet.) Focusing on the bow shock, the example shows that by scaling down to 75%, the rise time $\Delta T_{rise}$ to peak overpressure $\Delta P_{peak}$ is significantly reduced as compared to the full-scale vehicle; that is, from 56 milliseconds to 36 milliseconds. The magnitude of the overpressure level is also significantly reduced. Similar changes have also taken place at the tail shock.

The classical way to compensate for the reduced overpressure level generated by the sub-scale vehicle is to fly the sub-scale vehicle at a reduced altitude, since operating at a lower altitude will cause the overpressure level to be increased as illustrated in FIG. 6. (The shorter propagation distance from the reduced cruise altitude to the ground results in less attenuation of the pressure disturbance, thus increasing the overpressure level that reaches the ground.) For example, in FIG. 6, the ground signature produced by a given vehicle at an altitude of 55,000 feet is compared to the signature produced by the same vehicle at a reduced altitude of 45,000 feet. Noticeably, the magnitude of the peak overpressure, as well as the strength of all of the small, incremental shocks which together make up the pressure rise, is increased. Furthermore, the duration of the signature is slightly increased, but not by a significant amount. Therefore, when testing sub-scale vehicles in order to simulate the acoustic characteristics of a full-scale design vehicle, it is known to operate the sub-scale vehicle at a lower altitude so that the increase in maximum overpressure $\Delta P$ attributable to operating at a lower altitude offsets or compensates for the reduction in overpressure due to scaling, and the full-scale overpressure levels are matched.

FIG. 7 is an exemplary "map" showing rise times and peak overpressures associated with an array of scale factor/altitude combinations for a given vehicle operating at a given Mach number, viz., at the design point Mach number. In this particular example, the map has been generated for an aircraft that, full-scale, weighs 120,000 pounds, has an effective length of 165 feet, and is equipped with a two-stage extendable spike on the forward fuselage, which forms the first part of the signature shaping. In this regard, U.S. Pat. No 6,698,684 describes an example of such a spike and therefore is hereby expressly incorporated herein by reference. Furthermore, the particular aircraft of this example has a full-scale design operating point of Mach 1.8 at 55,000 feet altitude. Each node or intersection in the map represents a specific combination of vehicle scale factor and operating altitude at the set value of Mach 1.8, and sonic boom signatures have been computationally determined for each node. The abscissa value of each node indicates the (shaped) rise time to peak overpressure associated with the particular scale factor/altitude combination (at Mach 1.8), and the ordinate value of each node indicates the peak overpressure value associated with the particular scale factor/altitude combination (at Mach 1.8).

The node at a scale factor of 1 operating at 55,000 feet (at Mach 1.8) represents the full-scale operating point, and the horizontal and vertical "cross-hairs" (axis intercepts) indicate the rise time and overpressure associated with it. "Moving" horizontally to the left from the design point, as illustrated in FIG. 8, will identify (e.g., by interpolation) for any particular scale factor utilized the proper altitude at which to operate a sub-scale vehicle in order to generate the same overpressure level $\Delta P$ as the full scale vehicle. The curve in FIG. 9 summarizes the $\Delta P$ match points (required sub-scale operating altitude) for each scale factor.

Deficiency of Classical Acoustic Matching

It has been observed, however, that simply matching peak overpressure does not render the acoustic signature of a sub-scale vehicle the same as the acoustic signature of the design vehicle it is desired to represent. For example, the ground acoustic signatures of sub-scale vehicles having scale factors of 75%, 50%, and 25%—each operating at Mach 1.8 and at the associated overpressure match altitude point—are compared to the ground acoustic signature of a full-scale vehicle operating at Mach 1.8 in FIG. 10. Noticeably, although all four of the peak overpressures match, the four signature shapes are clearly quite different and will exhibit significantly different sound characteristics. Obviously, none of the sub-scale vehicles flown under these matched conditions provides a satisfactory model of a full-scale aircraft of interest.

At 25% scale, the duration of the boom signature is below the 50 millisecond threshold, and the boom will generally be perceived as a single loud crack rather than a double boom.

At 50% scale, the signature duration does exceed the 50 millisecond threshold, but at 80 milliseconds, the duration is only half of the full scale vehicle's duration. Furthermore, the rise time to peak overpressure of the shaped portion of the bow shock for the 50% vehicle is reduced by a greater percentage than the scale factor and thus produces less than half of the full scale airplane's rise time—down by more than half to just 37.3% of the full-scale rise time. Because the rise time and the exact characteristics of the pressure variation from zero to peak determine much of the sound characteristics of a sonic boom, a signature with only half (or less) of the rise time of a full-scale signature will not accurately reproduce or reflect the actual sound quality of the full-scale signature.

At a scale factor that is as large as 75%, the total signature length is 120 milliseconds, which is long enough that an observer will be able to distinguish clearly the bow and tail shocks. However, that rise time is still only two-thirds of the full-scale rise time, and again the sub-scale signature will produce different sound characteristics than the full-scale signature.

FIG. 11 graphically illustrates this observation with regard to the respective scaling rates of the significant aspects of acoustic signatures obtained following the classical scaling technique explained above (simply reducing operating altitude of the sub-scale vehicle to compensate for the reduced overpressure generated by the sub-scale vehicle). More particularly, FIG. 11 plots on the vertical axis the ratio of any particular measure or parameter of the sonic boom signature (such as rise time) for the sub-scale vehicle to that same measure for the full scale vehicle. A measure that scales at the same rate as the vehicle scale factor will be represented by a 45 degree line on the plot. Measures that scale slower than the vehicle will be above the 45 degree line, and measures that scale faster than the vehicle will be below the 45 degree line.

From this plot, it is observed that the total signature length (time) scales at approximately the same rate as the vehicle. For example, the 75% vehicle has a total signature which is approximately 77% as long as the full-scale signature; the 50% vehicle has a total signature which is approximately 53% as long as the full-scale signature; and so forth. Thus, although maximum overpressure ΔP of a full-scale vehicle might be matched with a sub-scale vehicle by using classical scaling techniques, the total signature length, which bears on how a given sonic boom is perceived, will not be matched.

More significantly, FIGS. 10 and 11 illustrate that rise time to peak overpressure, which plays a greater role in how a given sonic boom is perceived than total signature length does, scales faster than the vehicle. Thus, the 75% vehicle has a rise time that is approximately 67% of the full-scale shaped signature rise time; the 50% vehicle has a rise time that is approximately 37% of full-scale; and the 25% vehicle has a rise time that is just 11% of the full-scale rise time.

Given the manner in which total signature length scales with vehicle scale, and even more so given the manner in which the time to rise to maximum overpressure varies with vehicle scale factor, the utility of operating a scaled shaped sonic boom demonstrator according to the classical approach—simply changing operating altitude of the sub-scale vehicle to produce the same maximum overpressure as the full-scale vehicle—is significantly limited.

As noted above, the cost to build and operate a vehicle scales with size; therefore, to reduce costs associated with building and testing vehicles for demonstrating improved acoustic signatures, using generally smaller vehicles is desired. As illustrated immediately above, however, even for sub-scale vehicles as large as 75% of full-scale, the accuracy and hence the scientific value of the signature reproduction is lacking to such an extent that use of even this scale factor is questionable. Therefore, if truly useful, meaningful sonic boom data is to be obtained while at the same time realizing the cost savings associated with using sub-scale aircraft to generate the data, revised scaling techniques must be used.

SUMMARY OF THE INVENTION

As noted above, classical scaling and the associated scaling maps assume that the sub-scale aircraft will operate at the same design Mach number as the full-scale aircraft. According to the present invention, it has been discovered that the time attributes of a sonic profile—namely, the total length of the sonic profile and, more importantly, the time $\Delta T_{rise}$ to rise to maximum pressure—vary inversely with Mach number, which is a very surprising feature. Therefore, by operating a sub-scale aircraft at a Mach number lower than the design point Mach number (in addition to operating at an altitude that is lower than the design point), the sharp decrease in time to rise associated with down-scaling can be compensated. Thus, the full-scale time to rise to maximum pressure can be matched while also matching the full-scale maximum overpressure magnitude with a smaller aircraft at a slower speed and at a lower altitude. Moreover, the entire acoustic signature—i.e., the time for the overpressure to drop to underpressure and then recover through the tail shock—will be much closer to the design point or full-scale acoustic profile. Most of the deviation from full-scale signature exhibited by the sub-scale vehicle will present itself in the linear expansion portion of the signature, where its effect on the sound characteristics of the profile is minimal.

Recognizing this, according to the invention, a family of scaling maps is generated, with a scaling map being generated for each of a number of different Mach numbers at which the scaled aircraft might be operated. The family of scaling maps is then used to identify altitude and Mach number at which to operate a sub-scale aircraft in order to obtain a sonic profile that accurately represents the corresponding full-scale aircraft's sonic profile.

BRIEF DESCRIPTION OF THE DRAWINGS

These and other features of the invention will be made clearer in view of the detailed description below and the accompanying Figures, in which.

DETAILED DESCRIPTION

Figure 1:
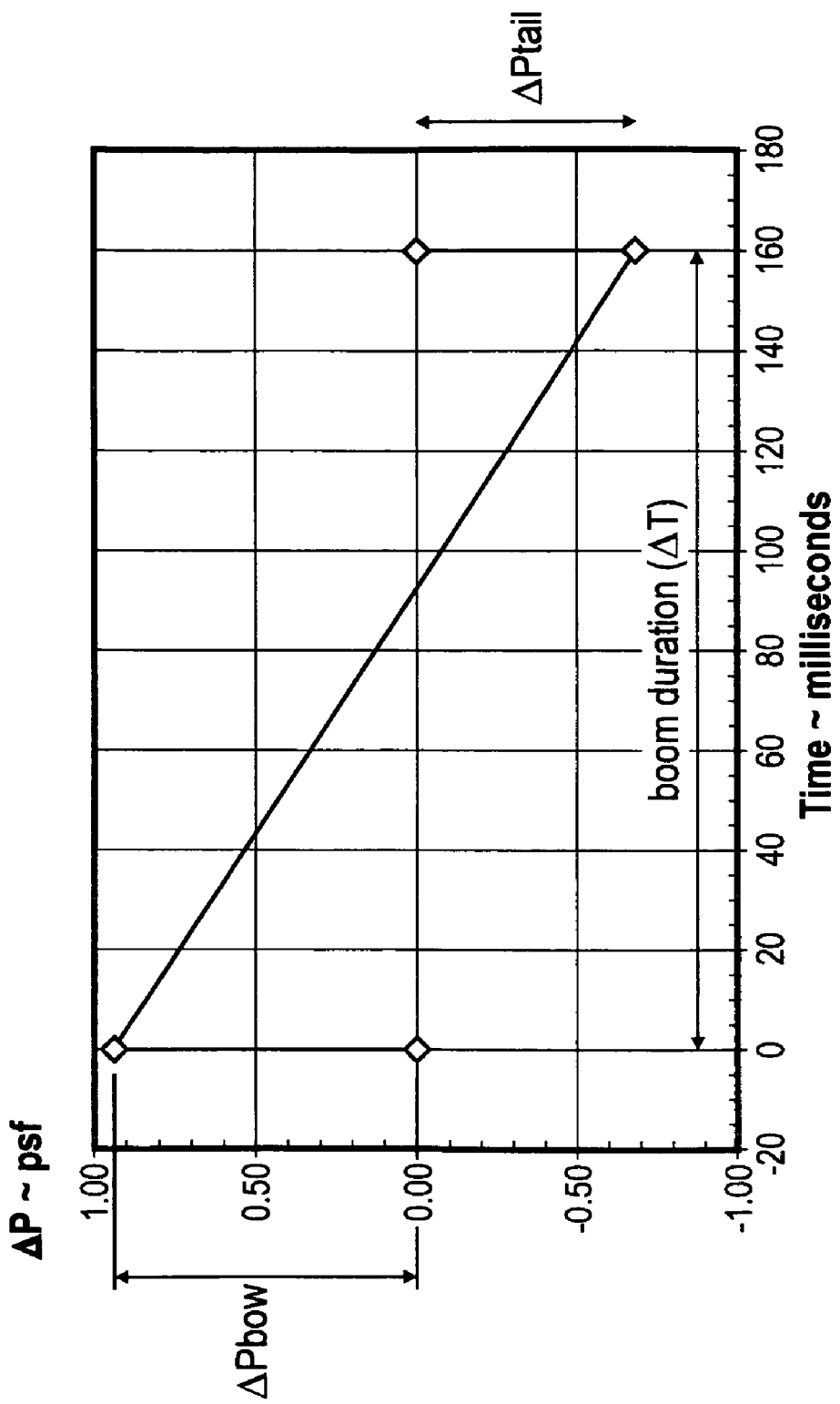
FIG. 1 is a theoretical plot of pressure versus time illustrating a conventional N-wave sonic boom profile.
Figure 2:
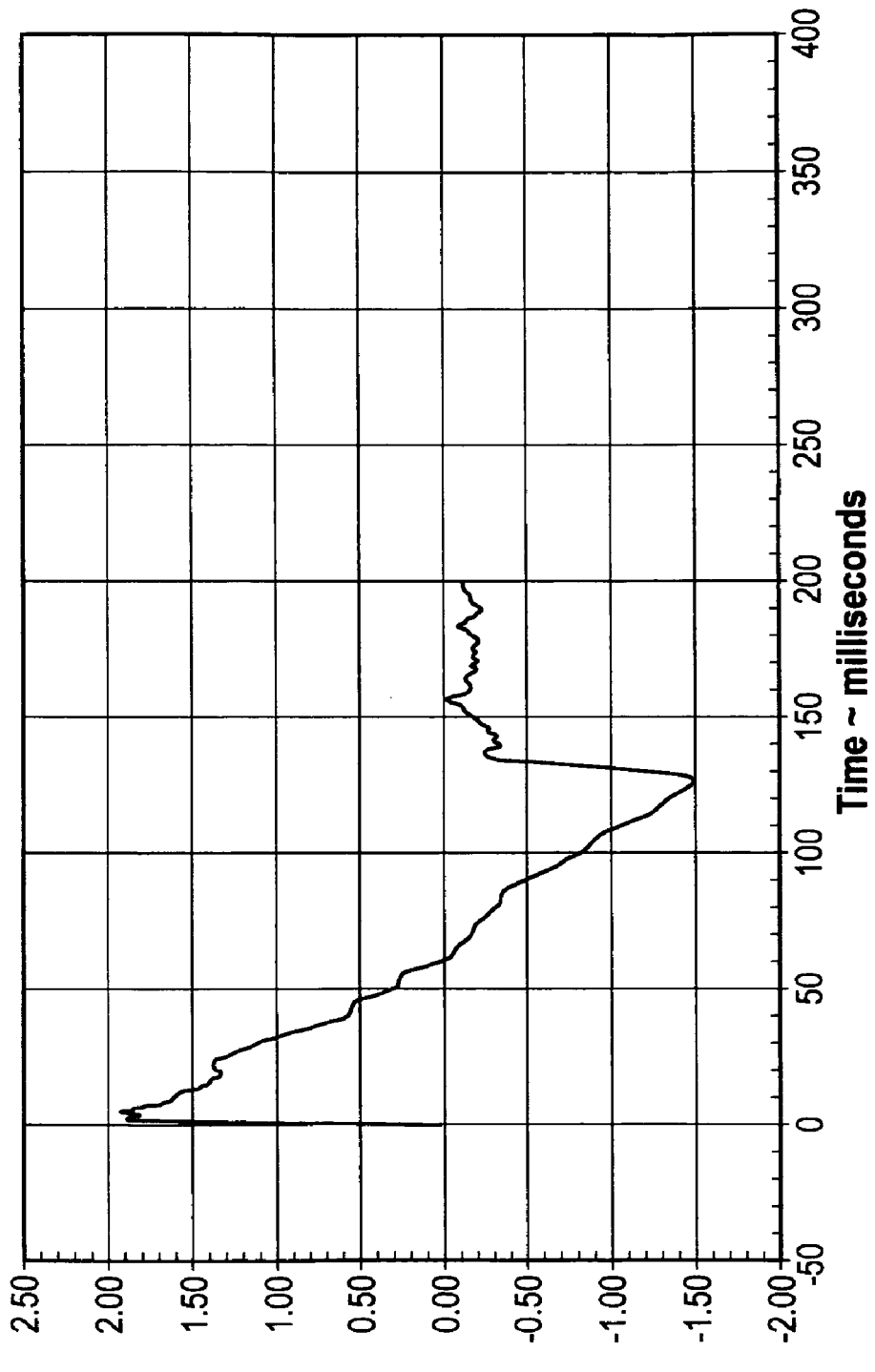
FIGS. 2 and 3 are plots of pressure versus time, similar to the plot of FIG. 1, but illustrating the sonic boom profile of two actual conventional supersonic aircraft.
Figure 3:
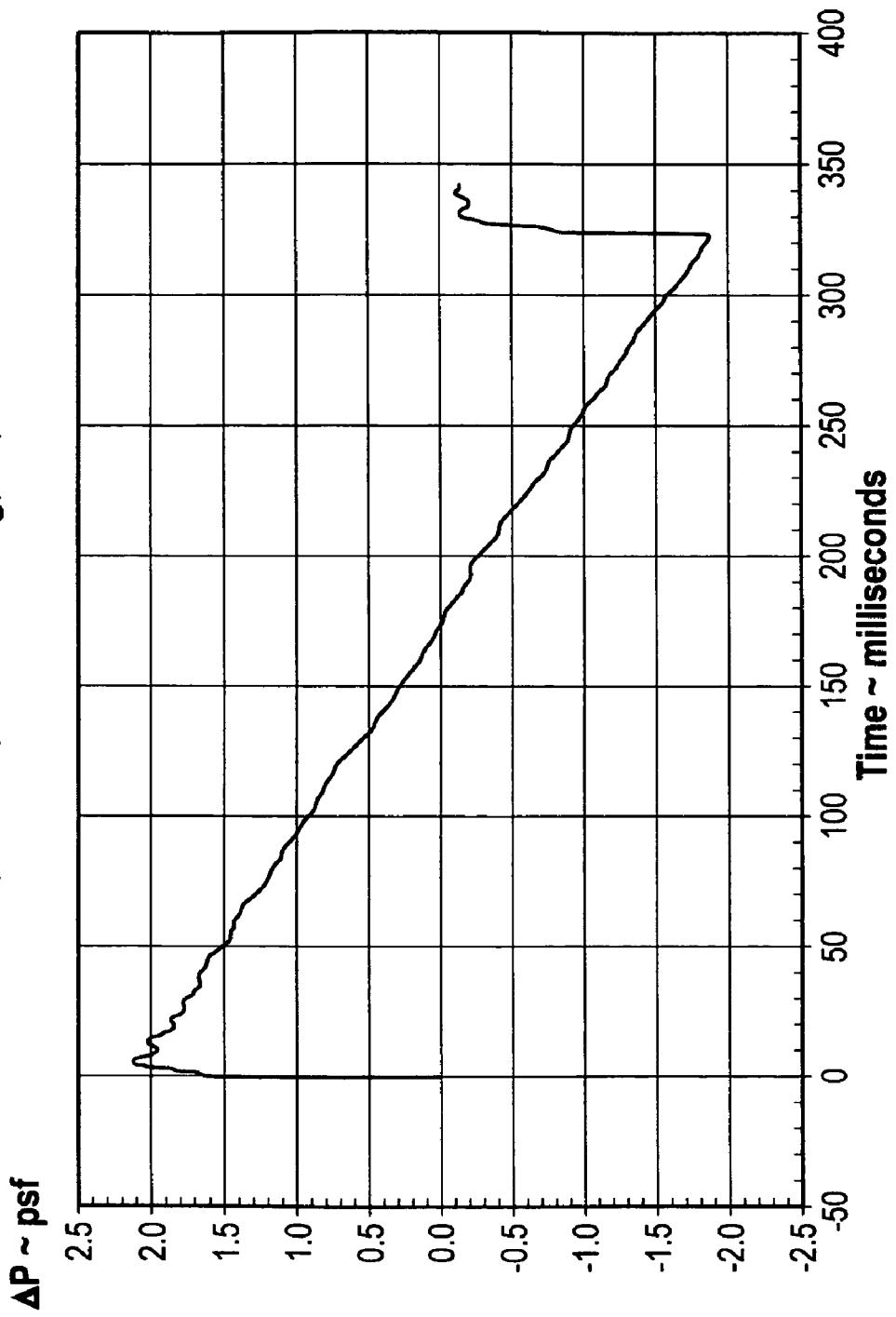
Figure 4:
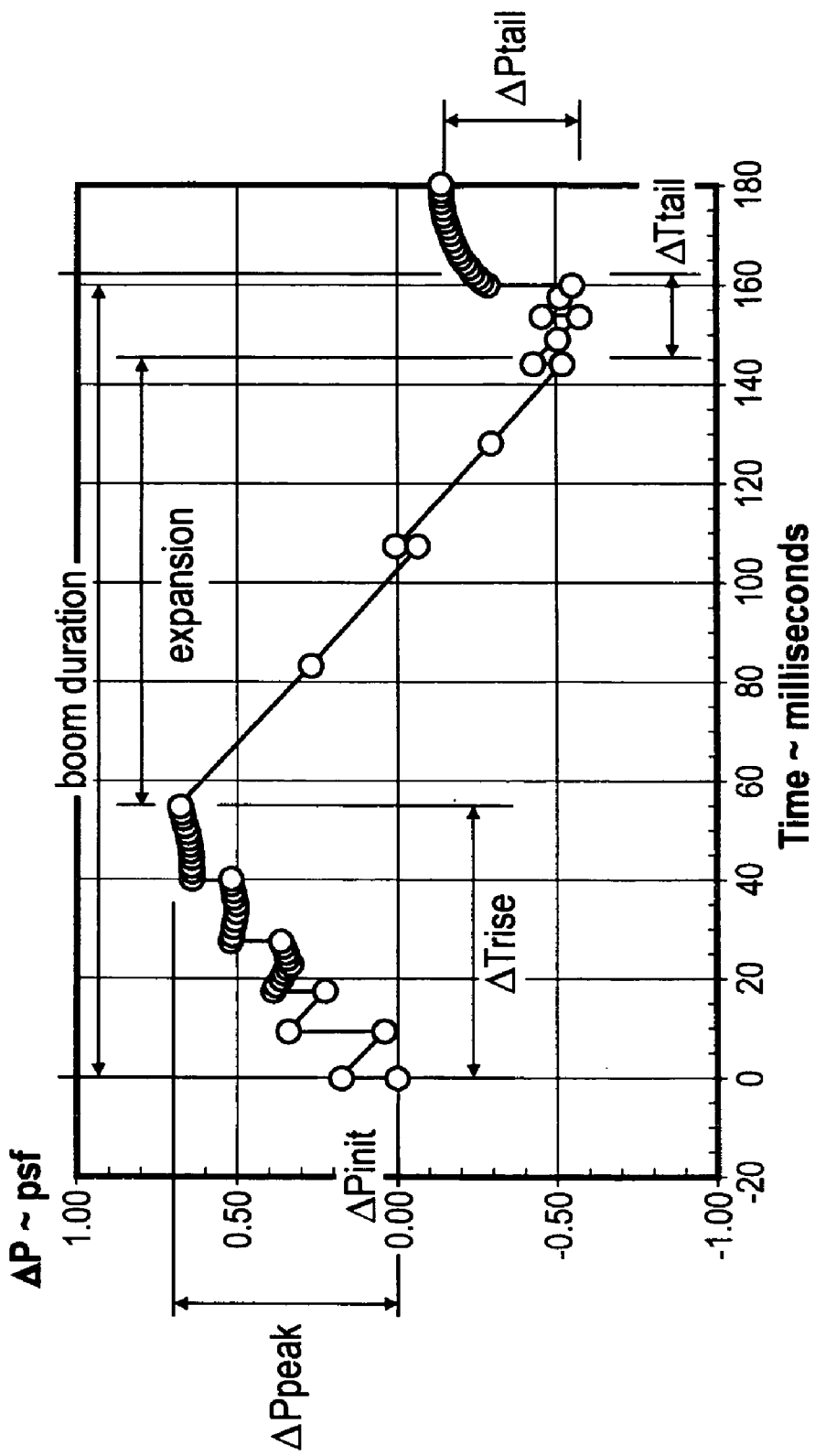
FIG. 4 is a plot of pressure versus time illustrating the shift in acoustic signature obtainable with sonic boom shaping.
Figure 5:
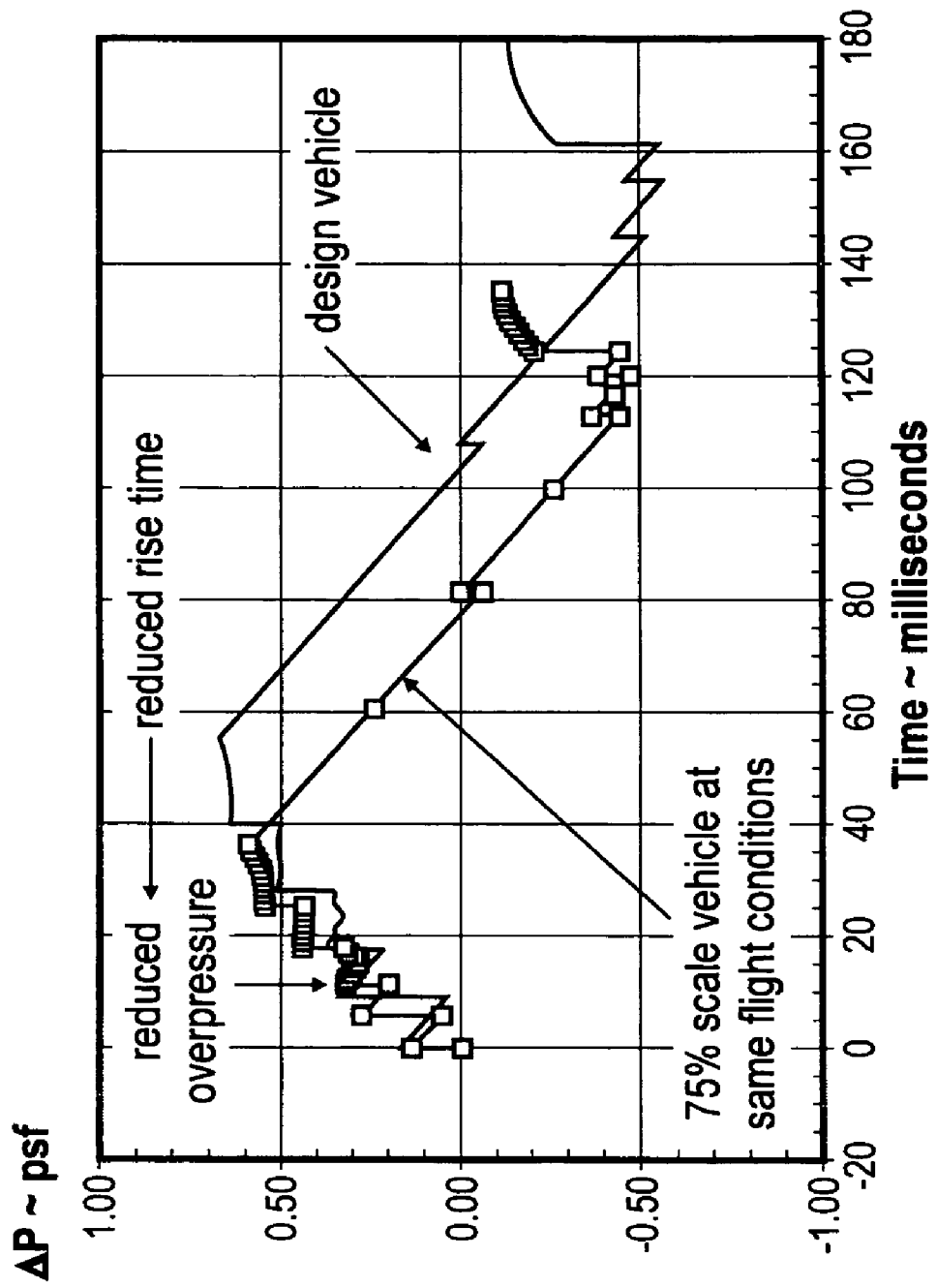
FIG. 5 is a comparative plot of pressure versus time illustrating the shift in maximum overpressure, time to rise to maximum overpressure, and total profile length associated with conventional vehicle scaling.
Figure 6:
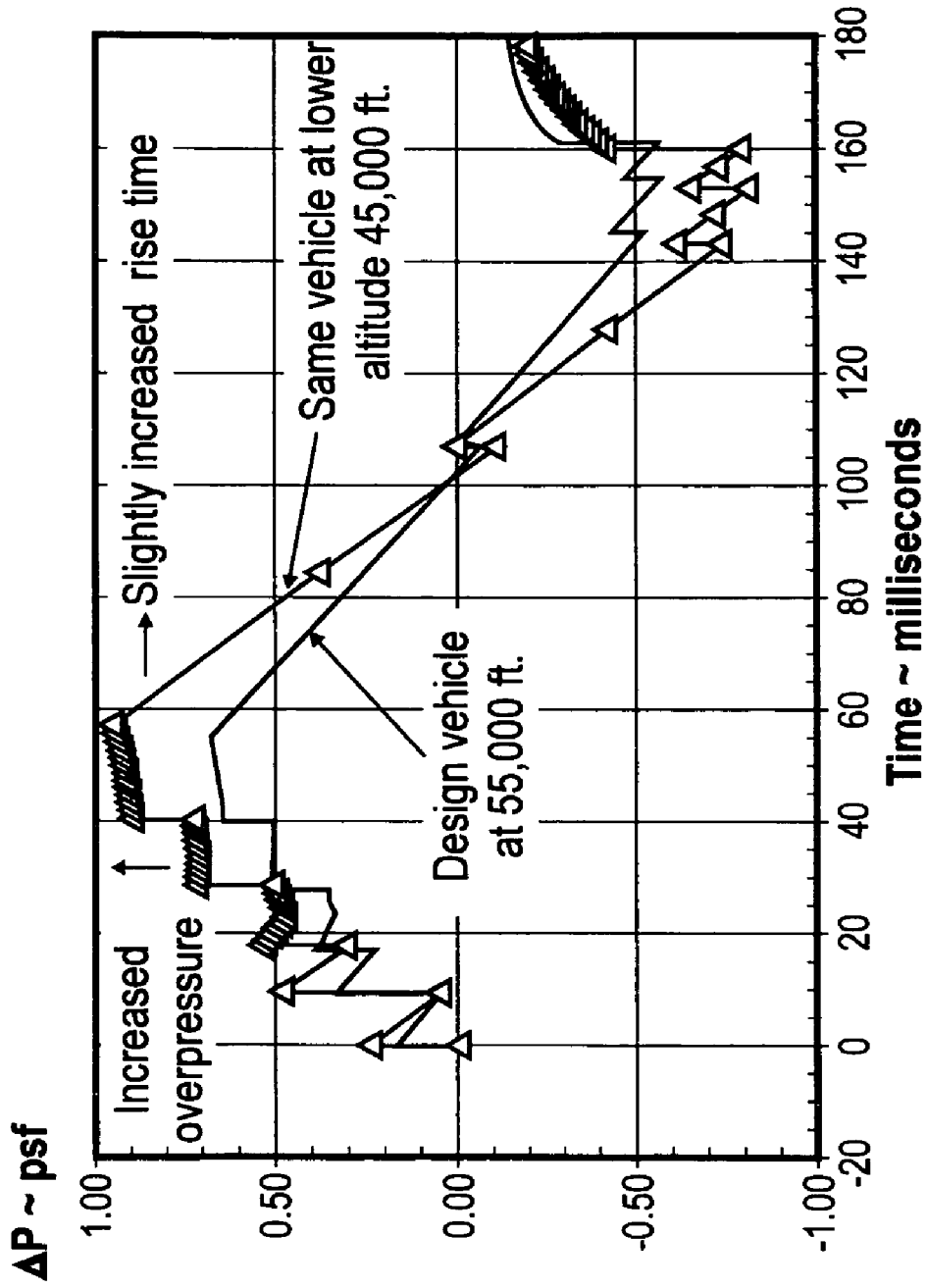
FIG. 6 is a comparative plot of pressure versus time, illustrating the shift in magnitude of overpressure and underpressure associated with change in operational altitude.
Figure 12:
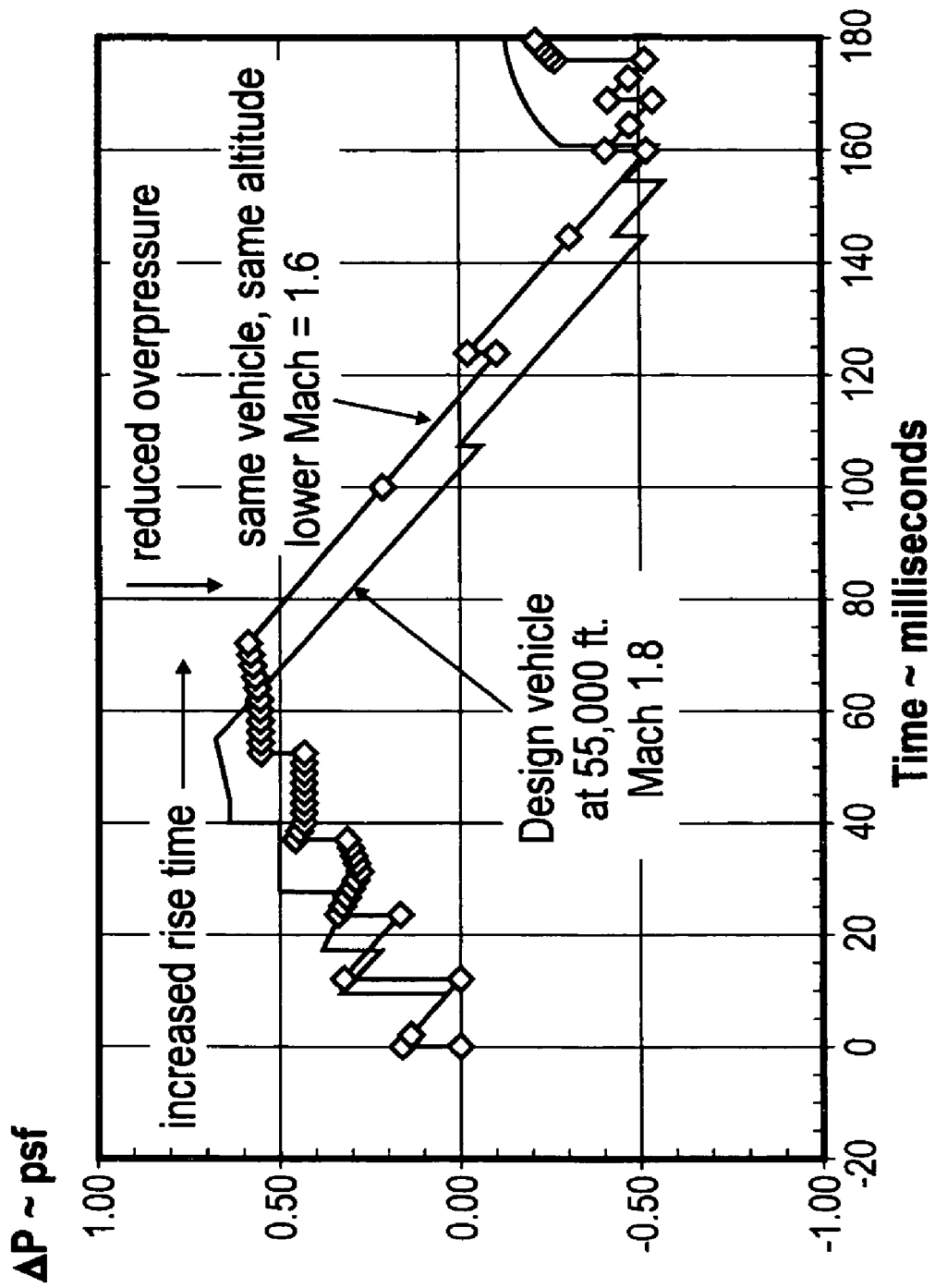
FIG. 12 is a comparative plot of pressure versus time, illustrating the shift with changing Mach number of the time attributes and the overpressure attributes of a sonic signature.

FIG. 12 illustrates the effect of Mach number on the sonic boom signature of a given vehicle. In particular, the sonic boom signature generated by a full-scale vehicle at its 55,000 foot, Mach 1.8 design point is compared to the signature of the same vehicle at the same altitude but operating at a reduced Mach number, e.g., Mach 1.6. Notably, when operating at the lower Mach level, the peak overpressure level is reduced (by an amount similar to that associated with scaling the aircraft down to 75% of its design size, as illustrated in FIG. 5), but the total signature length and the time to rise to peak overpressure ($\Delta T_{rise}$) are increased. Additionally, the shaping of the signature in terms of the magnitudes and locations of the small shocks that make up the rise to peak overpressure are closely maintained in proportion to the complete signature.

(Here, it is important that the sonic signatures be compared as functions of time as opposed to being compared as functions of distance, since the observer on the ground senses the pressure disturbance as it passes by him in time, not distance. If the same two signatures were plotted with distance as the independent variable, the lengths would be almost identical. Although the pressure disturbance may occupy the same sized portion of the atmosphere, it passes by the observer at a slower speed (since the vehicle generating it is traveling slower) and thus has a longer duration.)

Figure 7:
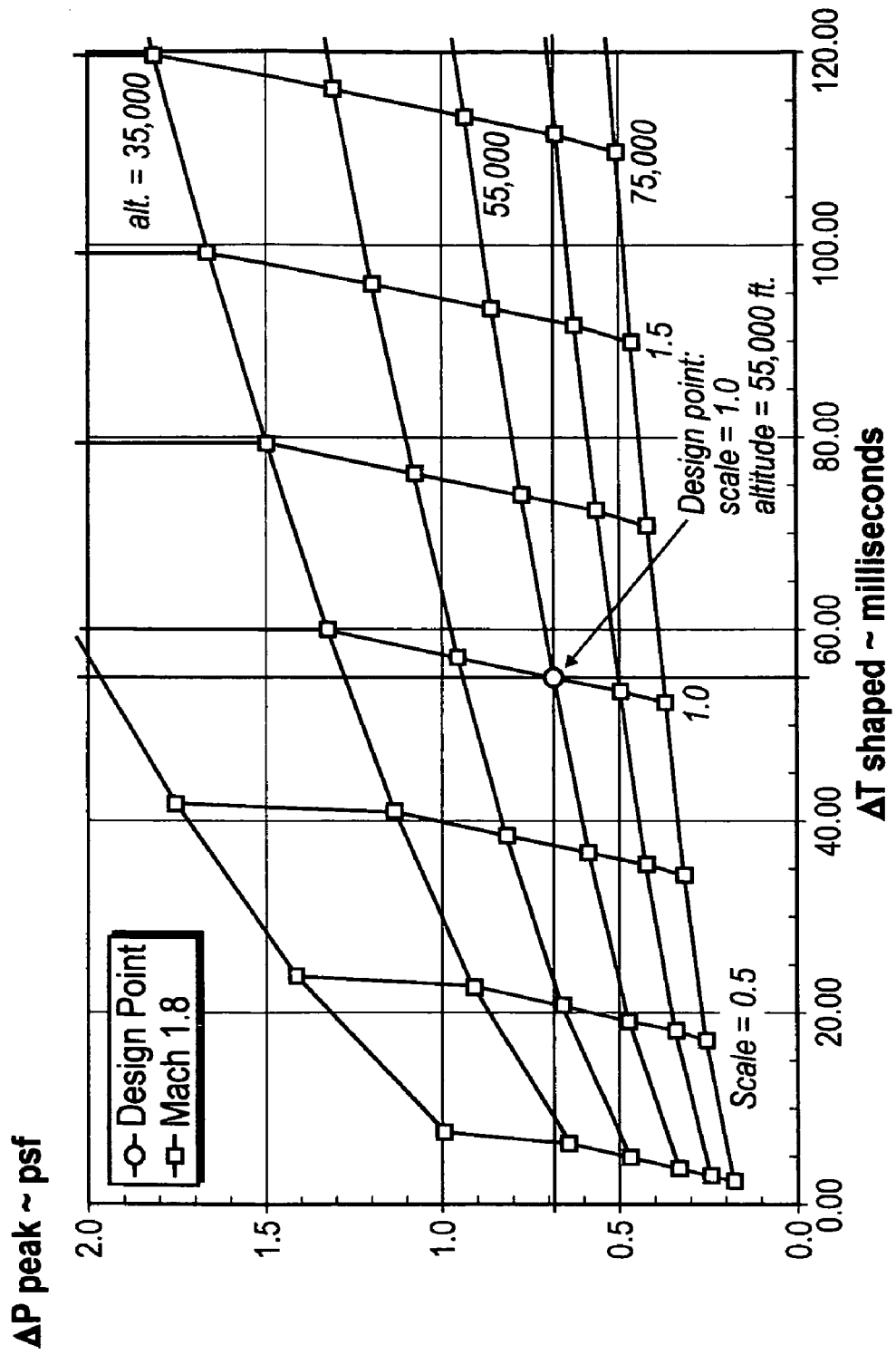
FIGS. 7 and 8 are classical, constant-Mach-number scaling maps.
Figure 8:
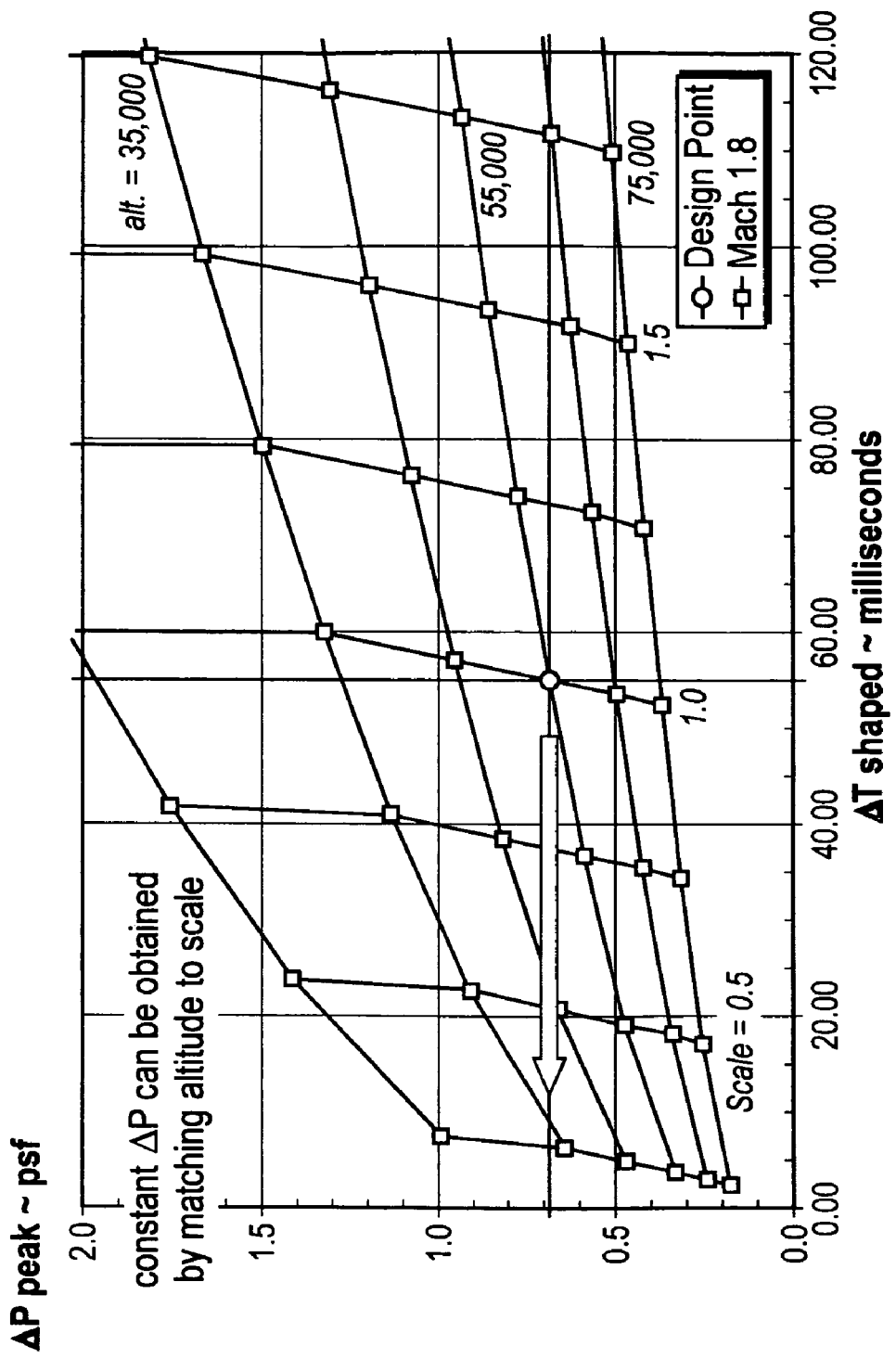
Figure 13:
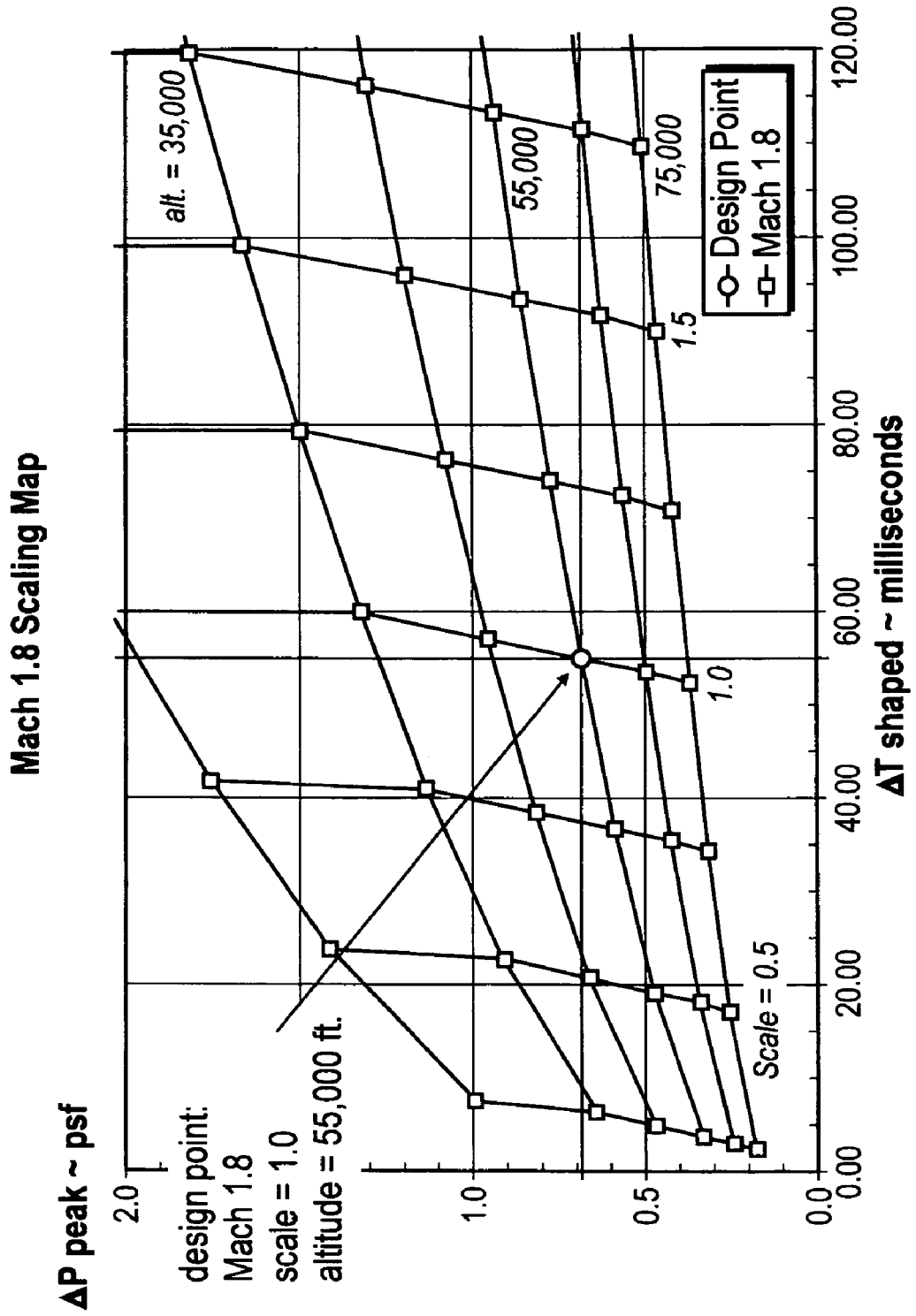
FIGS. 13-17 are a family of scaling maps for different Mach numbers.
Figure 14:
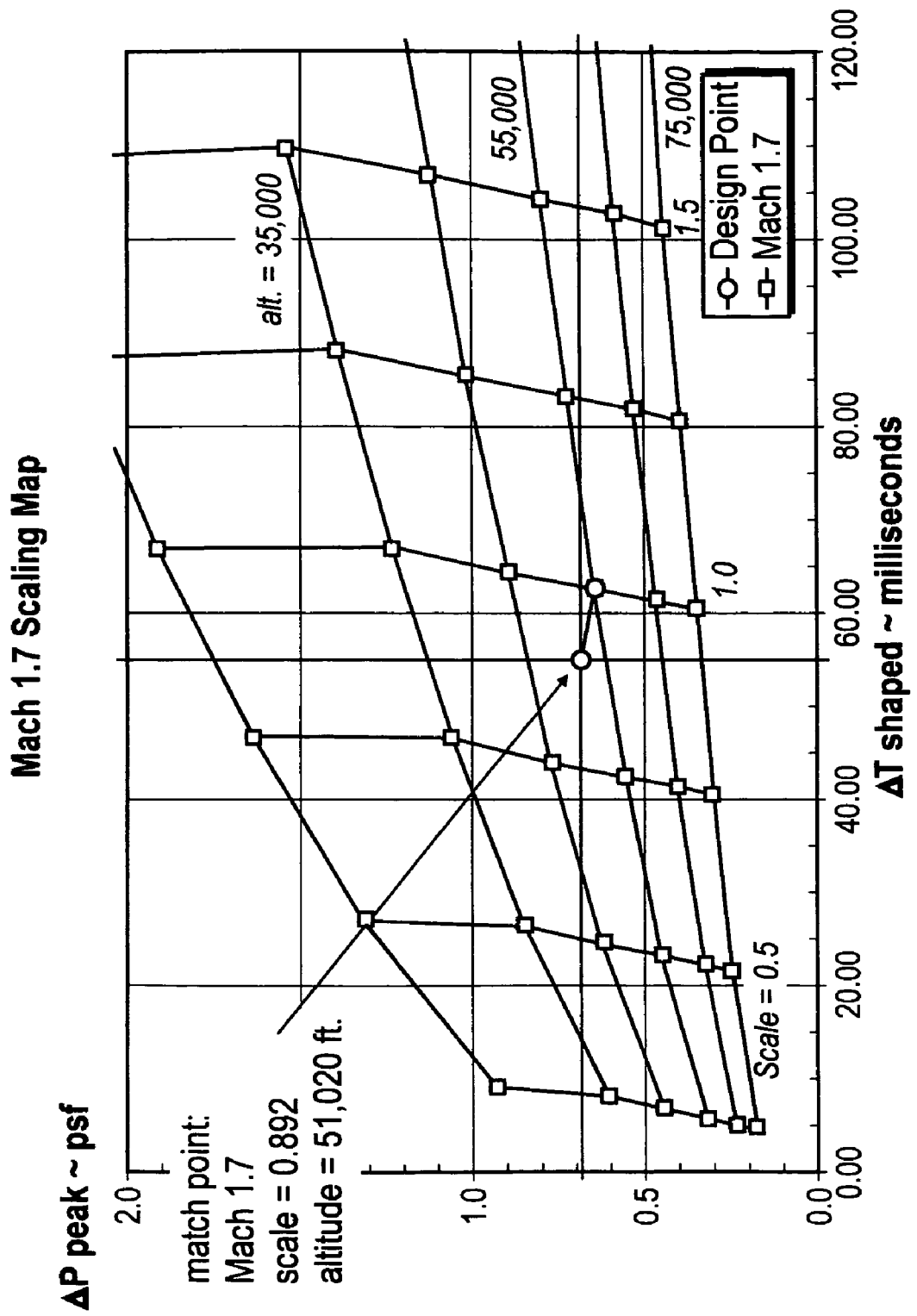
Figure 15:
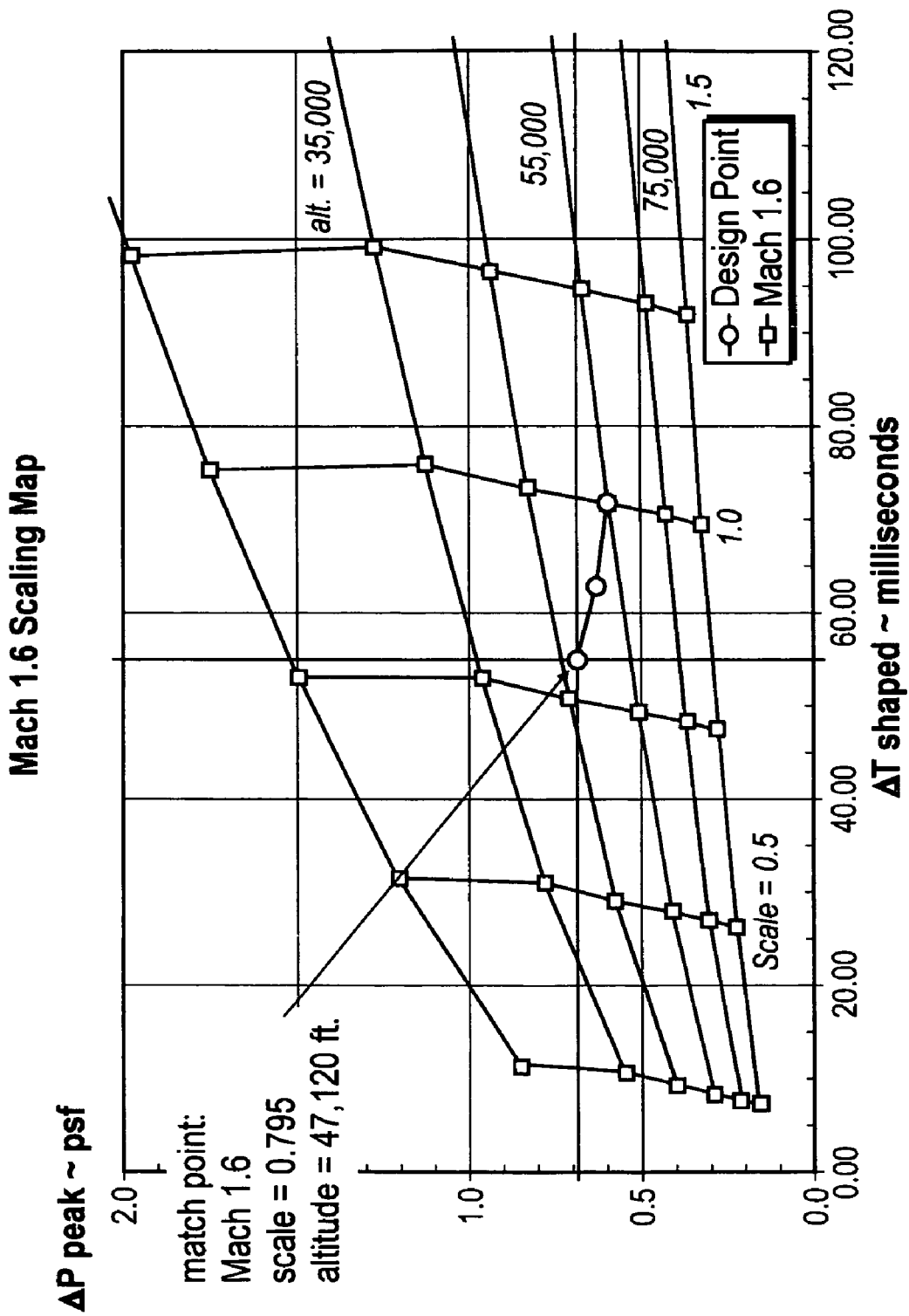
Figure 16:
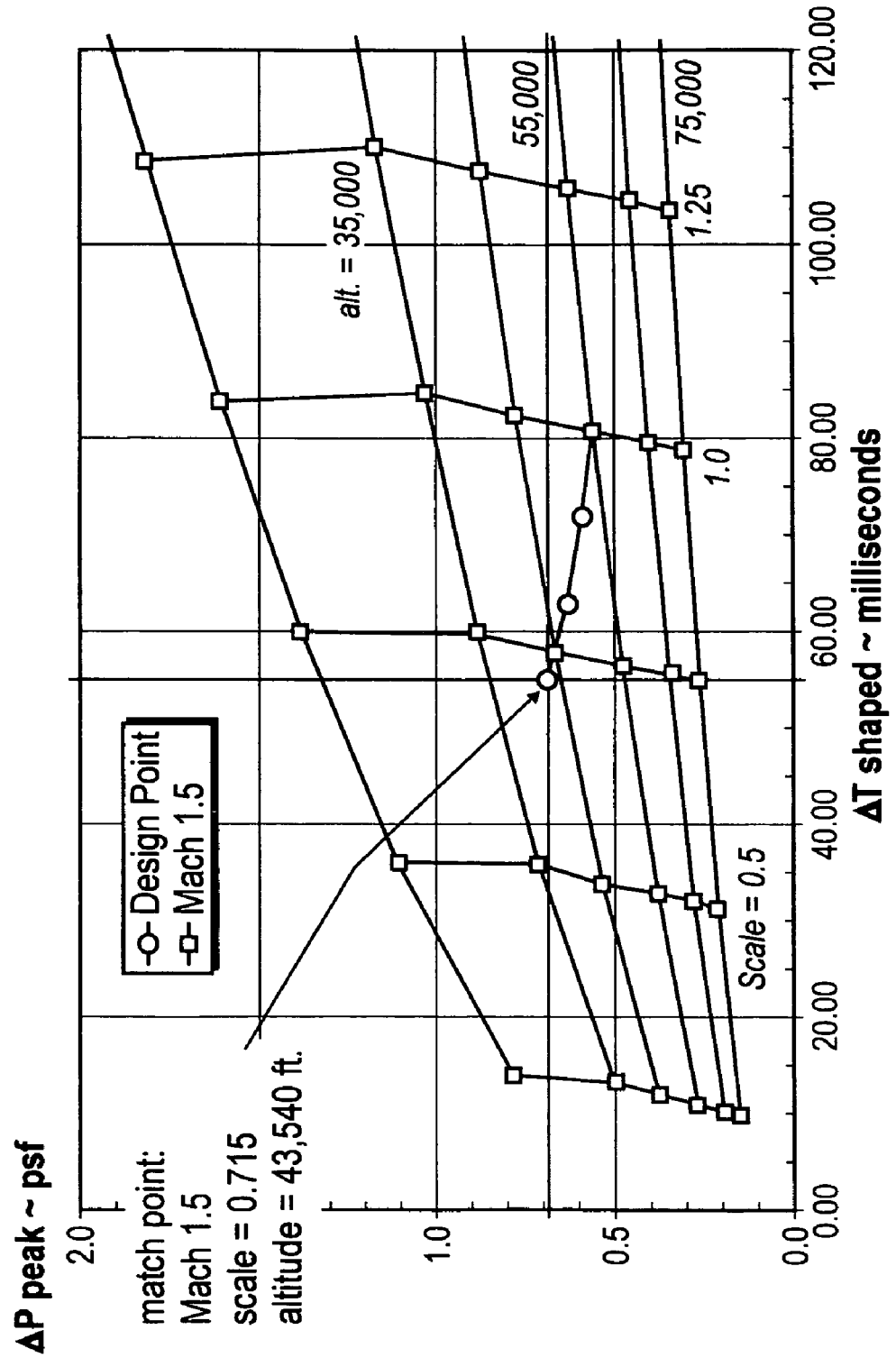
Figure 17:
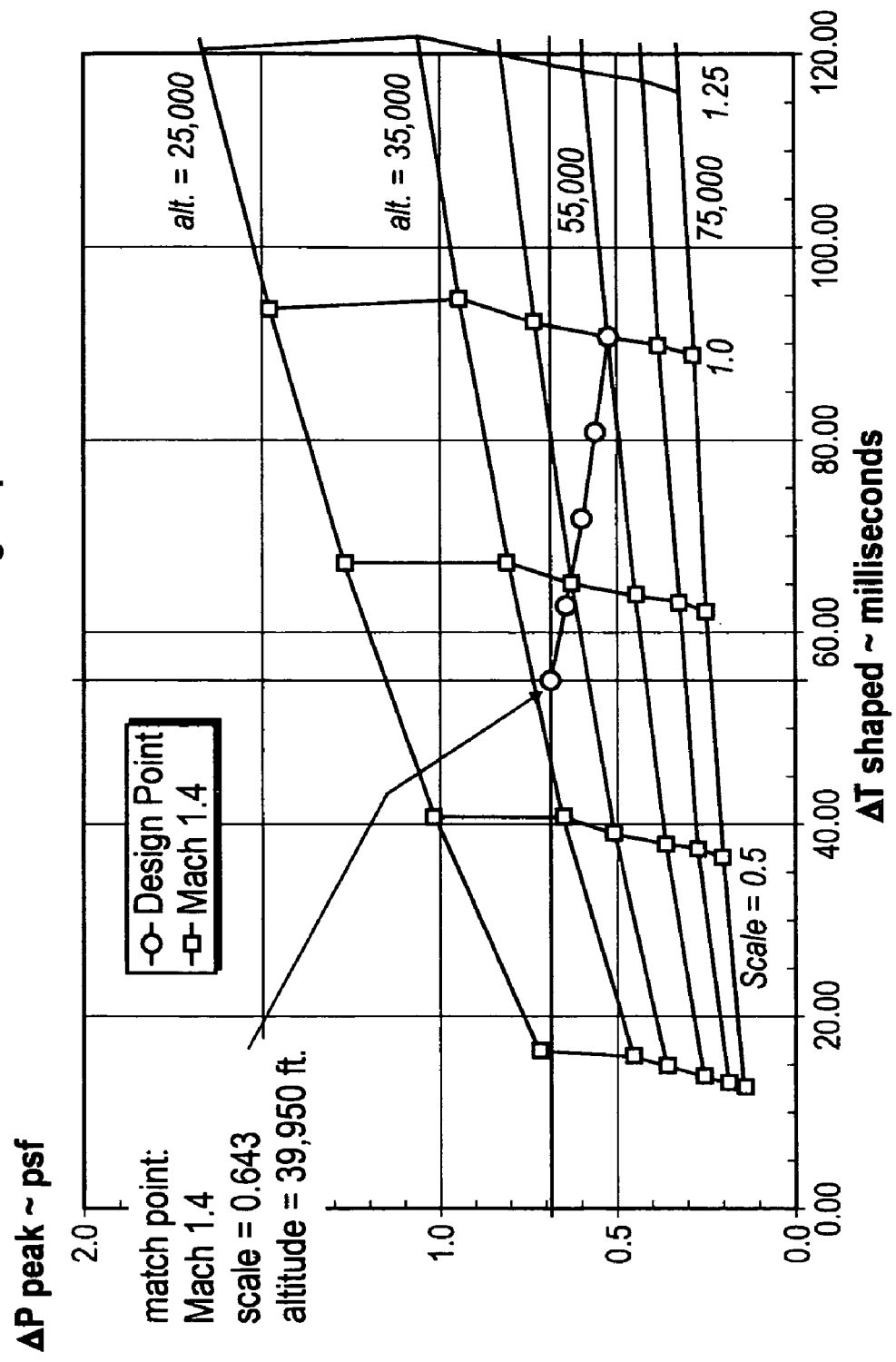

Thus, in contrast to the prior art in which a single, constant-Mach scaling map identifying $\Delta P$ and $\Delta T$ associated with each combination (node) of scale and altitude is generated, according to the invention, a family of such maps at different Mach numbers is generated. One such family of maps is illustrated in FIGS. 13-17, for Mach numbers of 1.8 down to 1.4 in increments of 0.1. (The map illustrated in FIG. 13 is the same as the map illustrated in FIG. 7.) For each Mach number below the exemplary Mach 1.8 design point (or above the design point, although maps are not shown for such overspeed conditions), there is a scale factor/altitude combination match point, where both the peak overpressure and the rise time are exactly matched to those exhibited by the full-scale aircraft operating at the design point. This match point combination can be determined, e.g., by interpolation between the computationally determined map node locations.

For the exemplary full-scale aircraft design point of 55,000 feet cruising altitude at Mach 1.8 used in these examples, the horizontal/vertical crosshairs (axis intercepts) show the full-scale aircraft to have a 55 millisecond rise time and a 0.68 pound per square foot peak overpressure (FIG. 13). As the operational Mach number is reduced in each successive Figure, the full-scale vehicle at its cruise altitude exhibits longer rise times and lower overpressures. (This is illustrated by the angled line which develops further in each subsequent plot.) By determining the scale factor and altitude at the $\Delta P/\Delta T$ match point cross hairs (interpolating as necessary to do so) for each map, a new sub-scale vehicle is defined at each Mach number. Thus, at Mach 1.7, the scale reduces to 0.892 (operated at 51,020 feet); at Mach 1.6, the scale reduces to 0.795 (operated at 47,120 feet); at Mach 1.5, the scale reduces to 0.715 (operated at 43,540 feet); and at Mach 1.4, a 0.643 scale vehicle (operated at 39,950 feet) is seen to produce a sonic boom signature with exactly the same peak overpressure and rise time as the original full scale vehicle.

Figure 9:
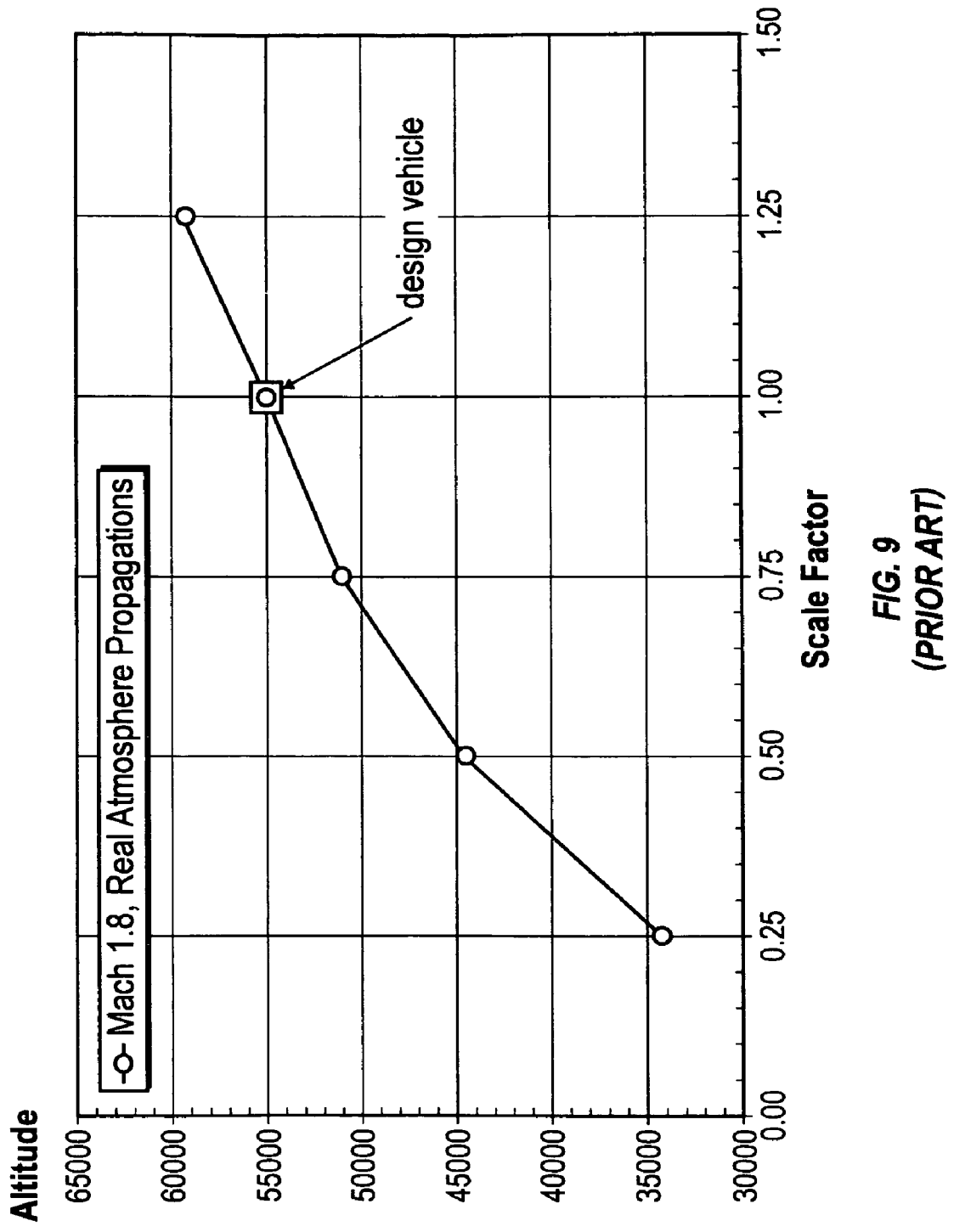
FIG. 9 is a plot of altitude versus scale factor, illustrating the altitude at which to operate a sub-scale vehicle to match peak overpressure associated with a full-scale vehicle according to the prior art.
Figure 10:
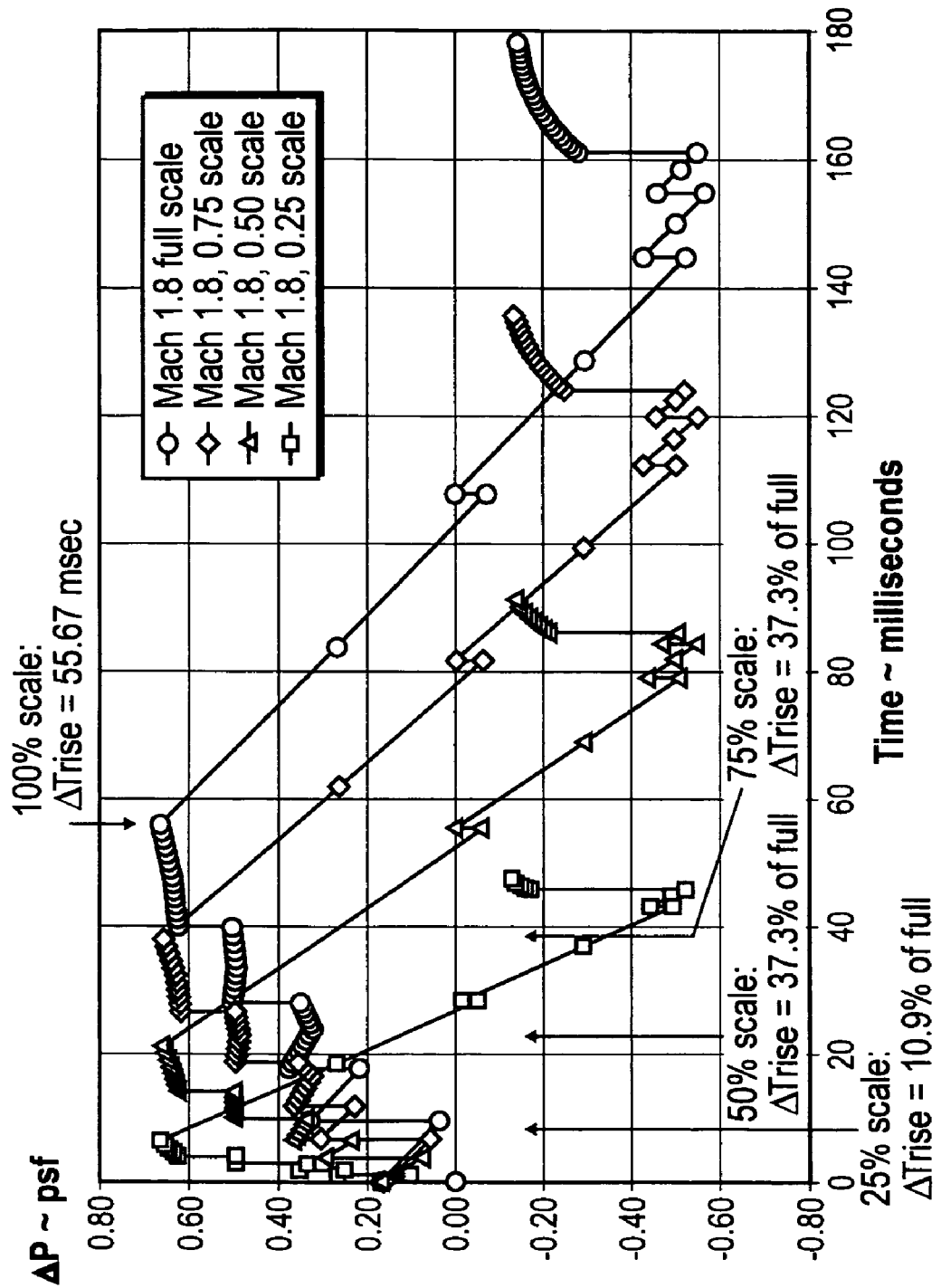
FIG. 10 is a comparative plot of sonic boom profiles, illustrating variation with scale factor of the signatures of ΔP-matched sub-scale supersonic vehicles according to the prior art.
Figure 11:
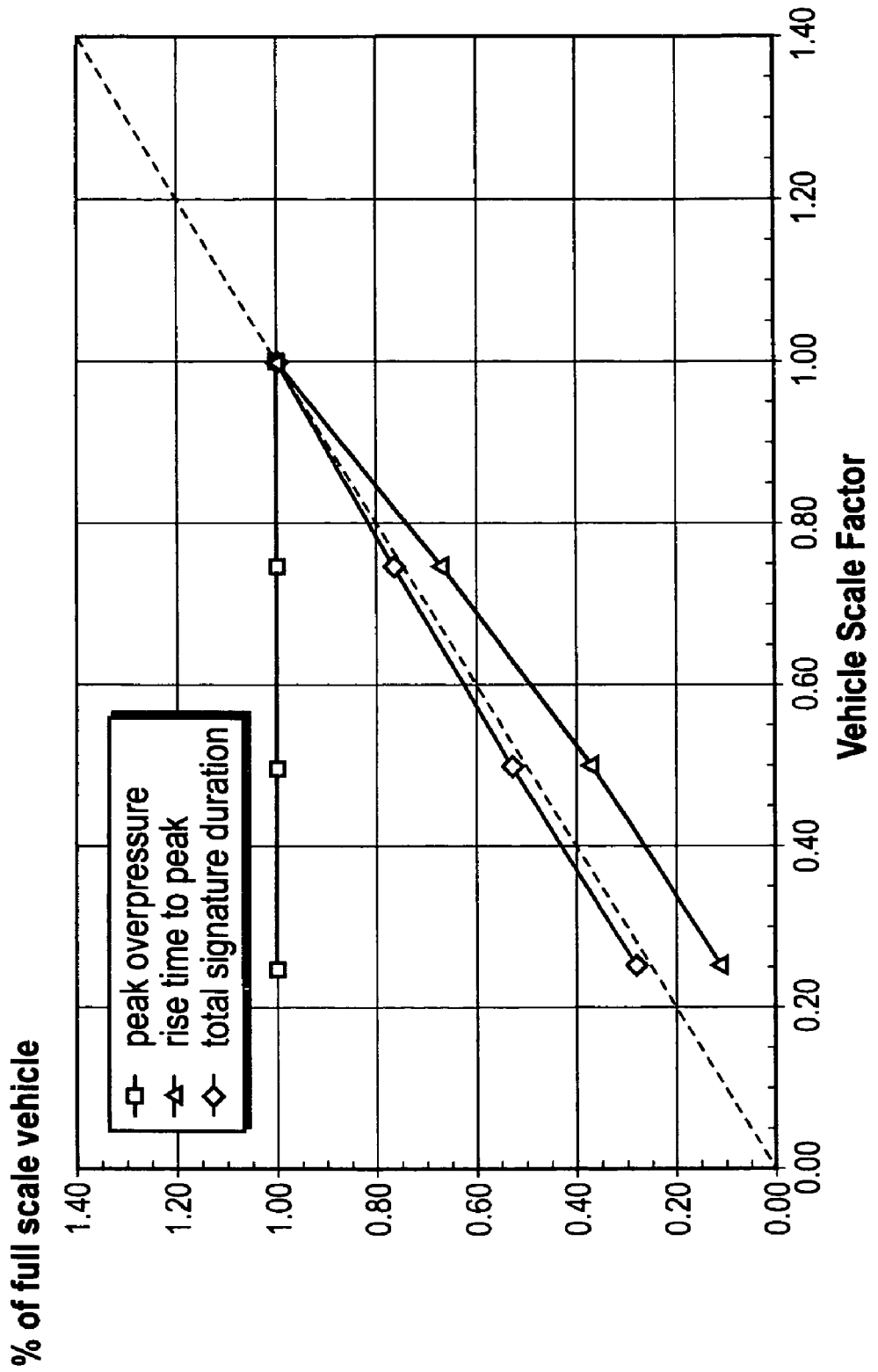
FIG. 11 is a plot illustrating as a function of vehicle scale factor the relative rates at which certain sonic signature time attributes scale according to the prior art.
Figure 18:
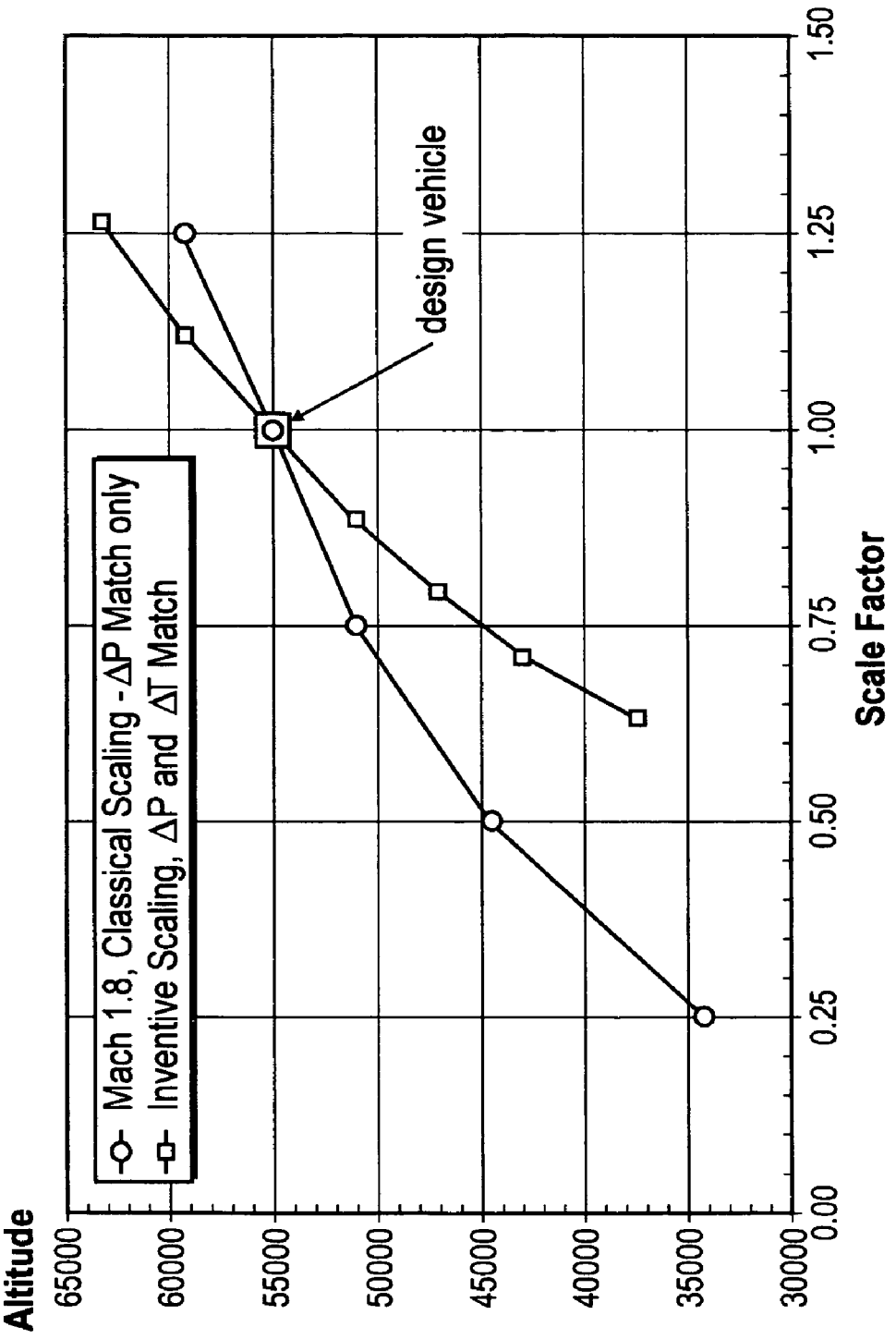
FIG. 18 is a comparative plot illustrating scale factor/altitude combinations to achieve matched sonic signatures according to the invention (with each point at a different but appropriate Mach number) as compared to the scale factor/altitude combinations (with each point at the same Mach number) to achieve matched ΔP only as per the prior art.
Figure 19:
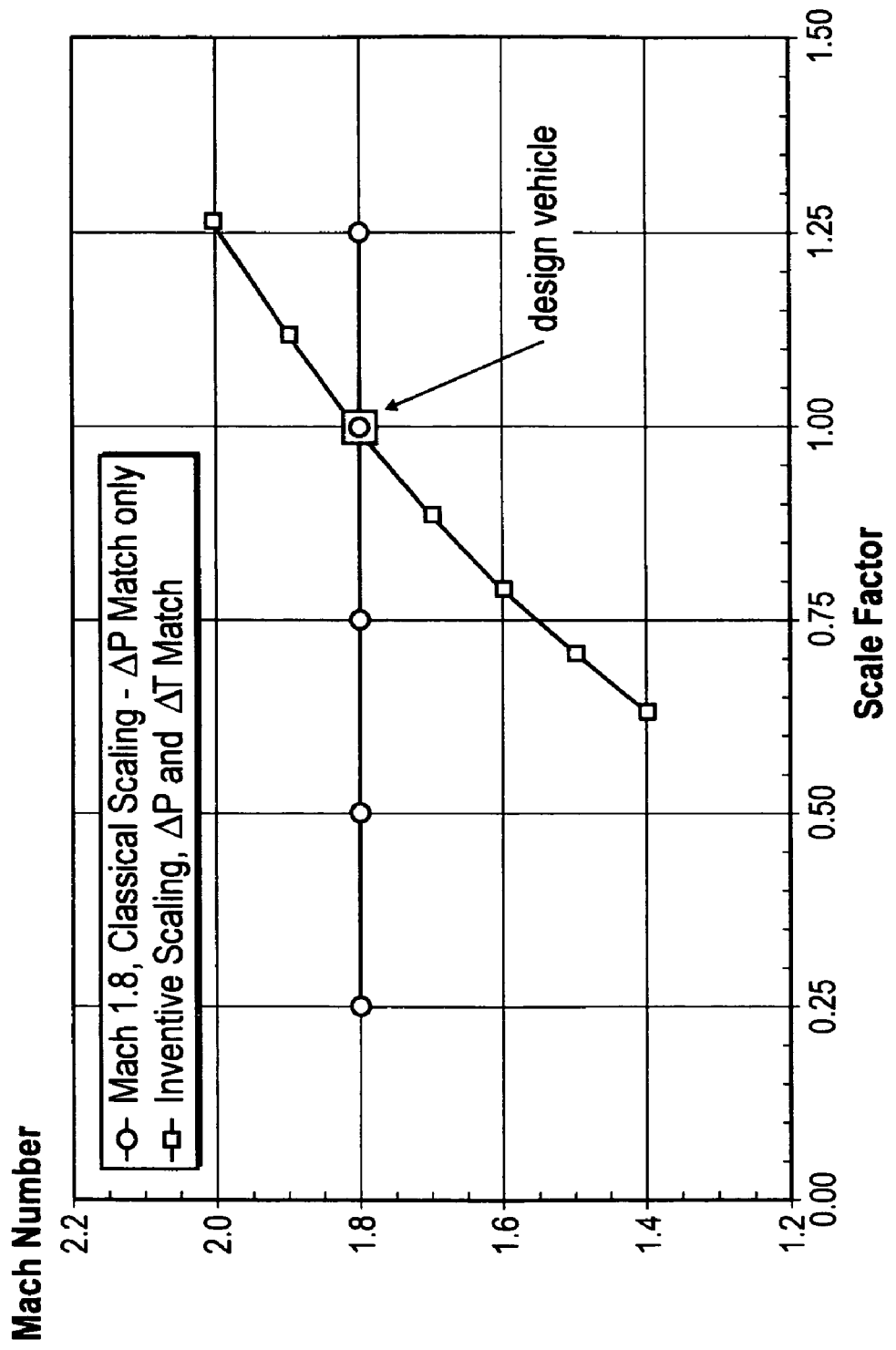
FIG. 19 is a comparative plot illustrating scale factor/Mach number combinations to achieve matched sonic signatures according to the invention, as compared to the scale factor/Mach number combinations to achieve matched ΔP only as per the prior art.

FIG. 18 summarizes the sub-scale flight altitudes associated with each of the match points in the maps of FIGS. 13-17 and compares them to the classical scaling curve from FIG. 9. Similarly, the Mach numbers associated with each of the match points in the maps of FIGS. 13-17 are plotted in FIG. 19 (and compared to the constant Mach number approach of the prior art). Thus, for any given scale of aircraft that is to be operated, the altitude and Mach at which that sub-scale aircraft should be operated to produce the same overpressure $\Delta P$ and rise time $\Delta T$ can be ascertained from the curves illustrated in FIGS. 18 and 19, respectively.

Figure 20:
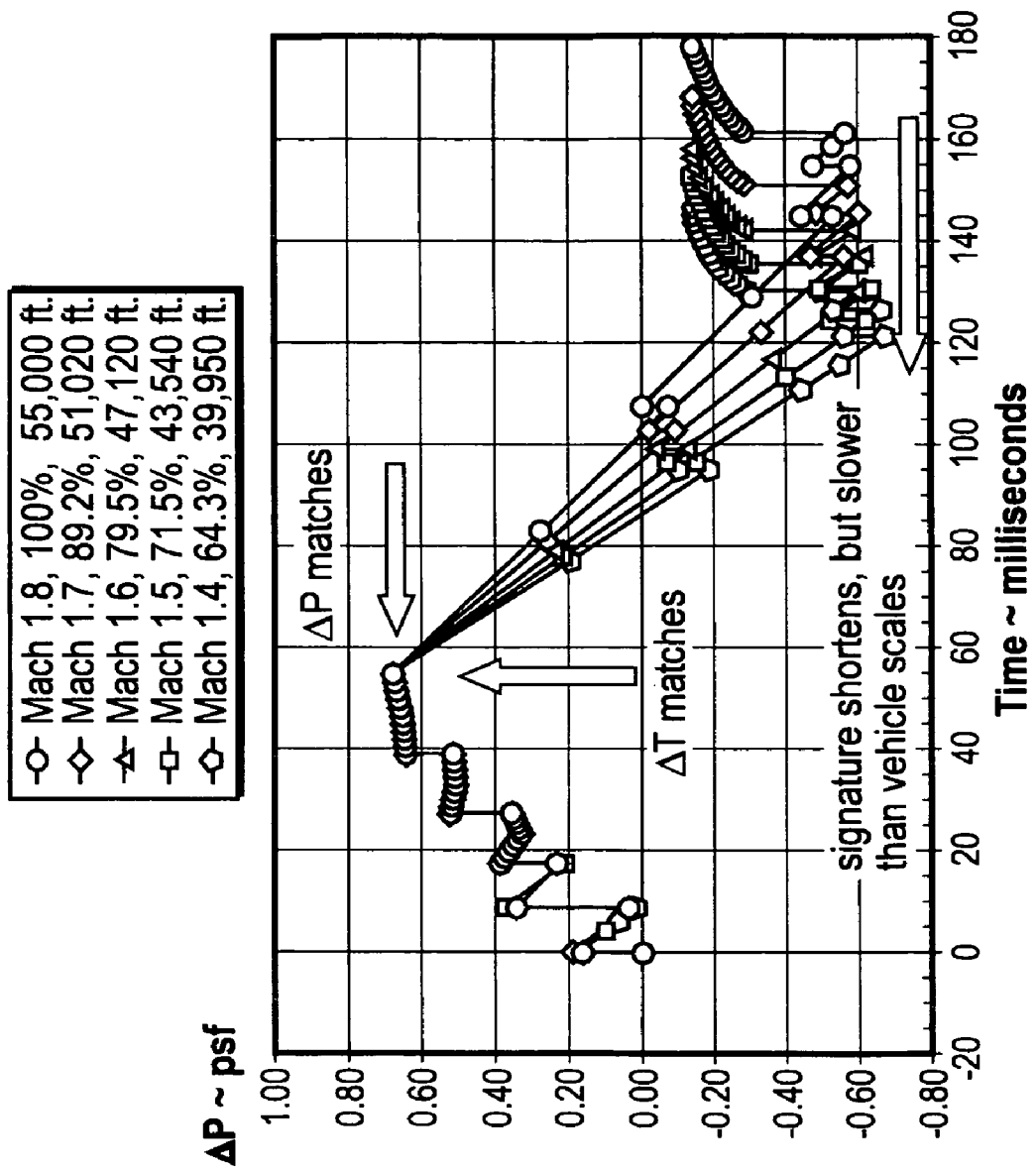
FIG. 20 is a comparative plot of ground signatures calculated for each of the acoustic match points identified using the maps in FIGS. 13-17.

The computationally generated ground signatures resulting from operating an appropriately scaled vehicle at each of the match points identified using the maps for Mach numbers 1.7, 1.6, 1.5, and 1.4 are compared in FIG. 20. In particular, at each Mach number, the propagated ground signature of the correctly scaled equivalent area distribution, operated at the match point Mach number and altitude, was computationally calculated in the same manner as the calculations used to generate the scaling maps. It will be observed that not only are the peak overpressure and the rise time matched quite well for all scale/Mach number/altitude operating points, but the entire character of the shaped portion of the signatures are nearly identical. Although the total signature duration does shorten somewhat as the vehicle is scaled down, it does so at a rate that is far less than is the case with classical scaling (which matches peak overpressure only). Thus, these signatures will produce much more nearly the same sound than signatures that match only overpressure and compromise the rise time, as is the case with classical scaling techniques.

Figure 21:
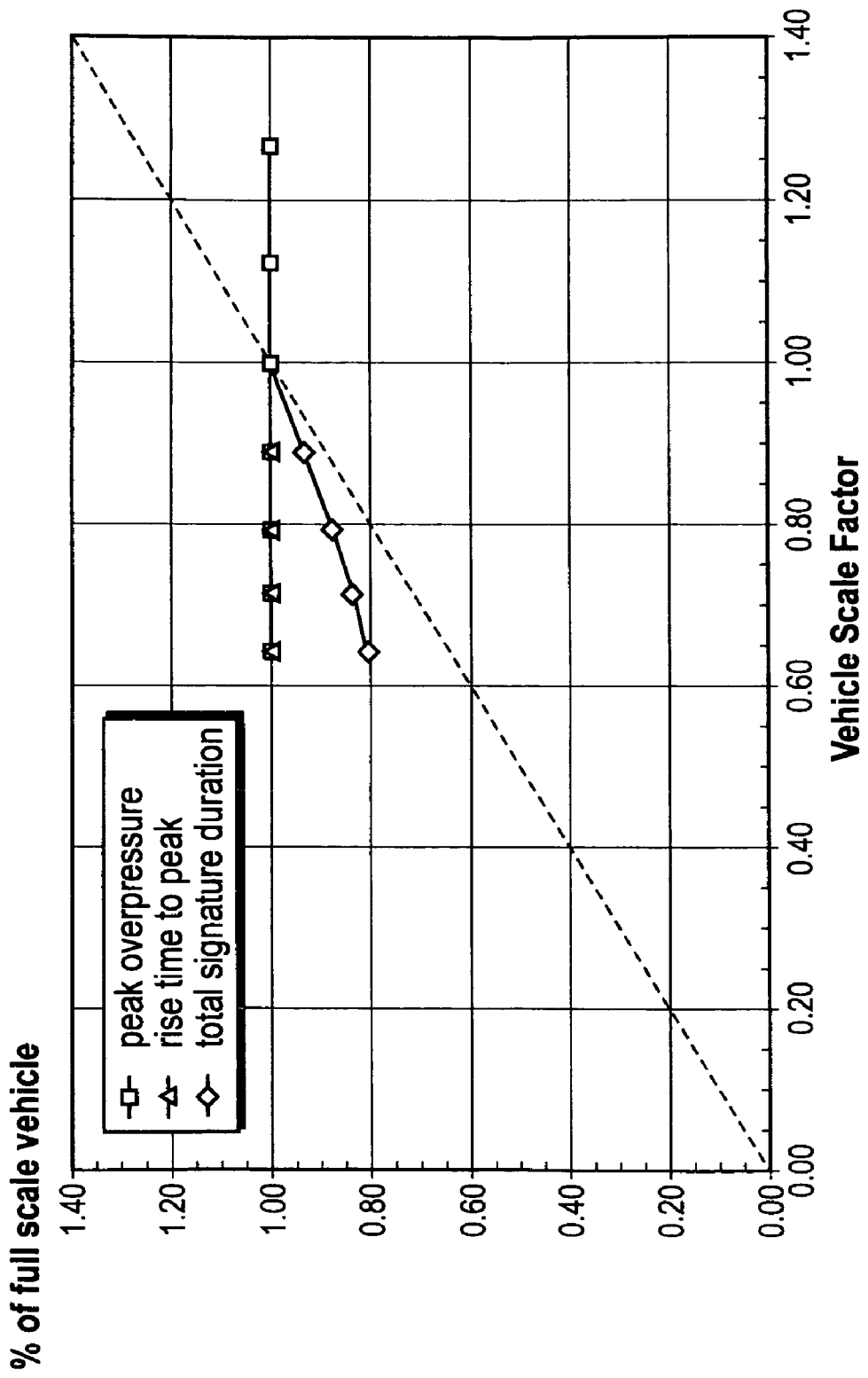
FIG. 21 is a plot illustrating as a function of vehicle scale factor the relative rates at which certain sonic signature time attributes scale according to the invention.

Finally, the scaling rates of the rise time and signature duration are compared in FIG. 21. These comparisons further illustrate the improved scaling. Rise time with scaling according to the invention (and peak overpressure) is independent of scale factor, in contrast to classical scaling rise times (which scale down faster than the vehicle scales, as explained above). Although the signature duration comparison is not as distinct as the rise time comparison, it does show that scaling according to the invention significantly improves retention of the full-scale airplane's signature.

Figure 22:
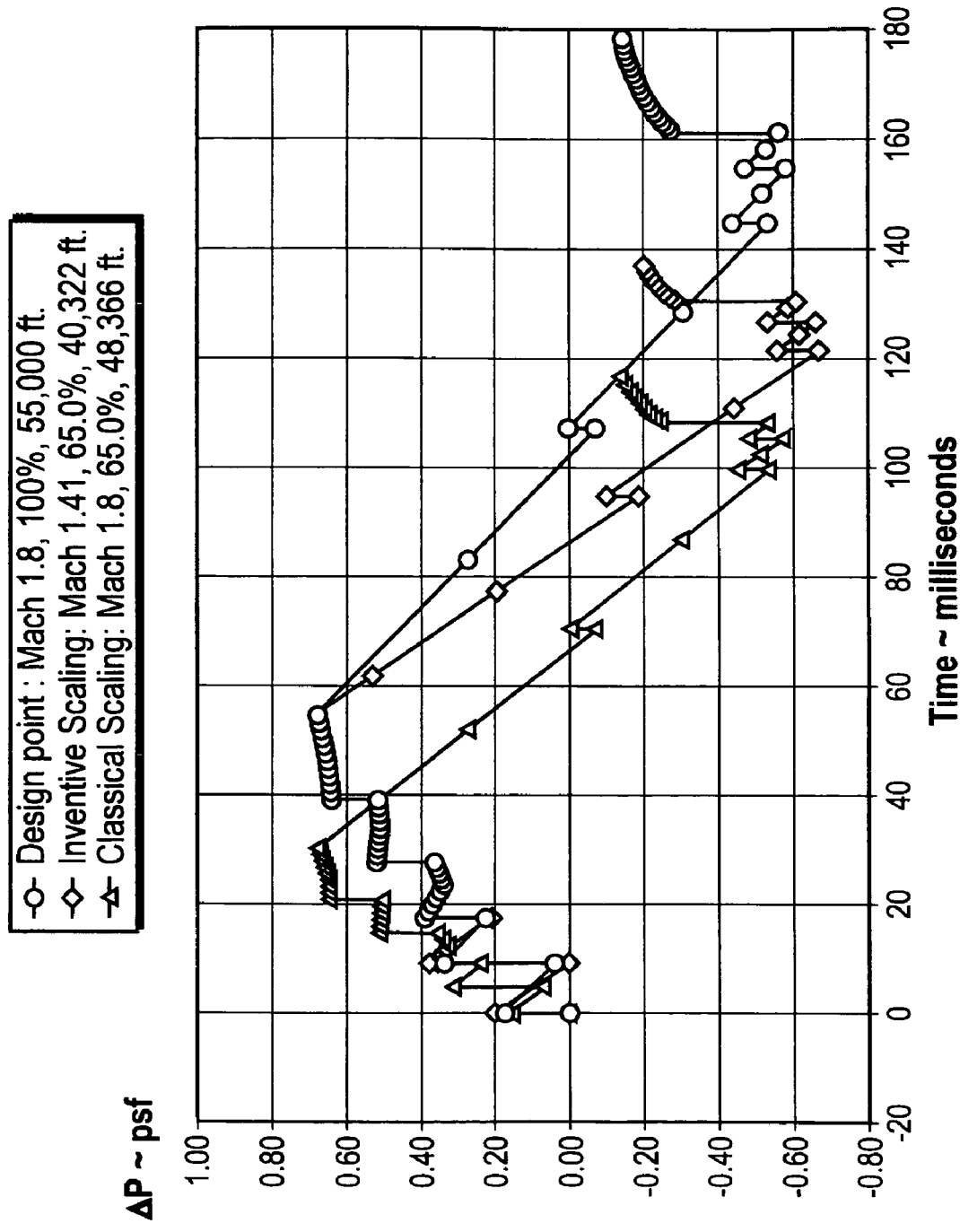
FIG. 22 is a comparison of ground sonic boom signatures of the full scale vehicle and 65% scale vehicles scaled according to the invention and according to classical constant-Mach-number scaling.

Clearly, scaling as per the invention is not limitless, as it is not linear and Mach number cannot continue to be reduced and still produce a sonic boom. Nevertheless, tremendous improvement over the classical constant-Mach-number approach to scaling can clearly be achieved. For example, as illustrated in FIG. 22, at a 65% scale factor, scaling according to the invention exactly reproduces peak overpressure and rise time with a signature whose total duration is 81% of the full scale vehicle. In comparison, classical scaling at the same 65% scale would yield the same peak overpressure, but a rise time of just 55% and total signature duration 67% of the full scale signature. FIG. 22 compares the propagated ground signatures of the full scale design vehicle; the 65% vehicle scaled according to the invention; and the 65% vehicle according to classical, constant Mach number scaling. In terms of generating meaningful data to be used in evaluating shaped acoustic signatures, which will be a critical step toward opening up supersonic flight over land, the scaling method of the invention is far more useful.

Finally, while the invention has been illustrated in the specific exemplary context of matching peak overpressure and time to rise to peak overpressure, the principles of the invention may be applied in order to match other pairs of sonic parameters that are of interest (e.g., peak overpressure and total signature duration; peak overpressure and peak underpressure; etc.). Therefore, the scope of the invention is defined by the following claims.

We claim the following:

1. A method for evaluating the acoustic signature produced by an aircraft of interest flying at a particular supersonic Mach number/altitude operating point of interest, the method comprising:

operating a sub-scale aircraft that is a sub-scale version of the aircraft of interest at a supersonic Mach number and at an altitude that are respectively different from the Mach number and the altitude associated with the operating point of interest, the Mach number and the altitude at which said sub-scale aircraft is operated being selected such that peak overpressure generated by said sub-scale aircraft and time to rise to peak overpressure are the same as peak overpressure and time to rise to peak overpressure caused by operating the aircraft of interest at the operating point of interest; and evaluating the acoustic signature produced by the sub-scale aircraft.

2. The method of claim 1, wherein the Mach number at which the sub-scale aircraft is operated is less than the Mach number associated with the operating point of interest.

3. The method of claim 1, wherein the altitude at which the sub-scale aircraft is operated is less than the altitude associated with the operating point of interest.

4. The method of claim 1, wherein the Mach number at which the sub-scale aircraft is operated is less than the Mach number associated with the operating point of interest and wherein the altitude at which the sub-scale aircraft is operated is less than the altitude associated with the operating point of interest.

5. A method for determining the Mach number and altitude at which to operate a sub-scale aircraft so as to emulate sonic attributes of a full-scale aircraft of interest flying at a supersonic operational point of interest, said method comprising:

generating a family of scaling maps with a scaling map being generated for each of a series of Mach number operational values, nodes on each scaling map each representing a specific combination of operational altitude and scale factor, one coordinate value of each node representing peak overpressure and another coordinate value of each node representing time to rise to peak overpressure associated with the combination of altitude and scale factor represented by the specific node;

identifying on each of said scaling maps an operational match point having associated therewith a peak overpressure value and a time to rise to peak overpressure value that are the same as the peak overpressure value and time to rise to peak overpressure value associated with flying the aircraft of interest at the operational point of interest, and determining a combination of scale factor and operational altitude value associated with each operational match point;

using the combinations of scale factor/operational altitude values determined from the family of scaling maps, generating a curve of Mach as a function of scale factor and a curve of operational altitude as a function of scale factor; and using said curves, determining a Mach value and an altitude at which to operate the sub-scale aircraft based on the scale factor thereof.

6. A method for modeling the acoustic signature produced by an aircraft of interest flying at a particular supersonic Mach number/altitude operating point of interest, the method comprising:

operating a sub-scale aircraft that is a sub-scale version of the aircraft of interest at a supersonic Mach number and at an altitude that are respectively different from the Mach number and the altitude associated with the operating point of interest, the Mach number and the altitude at which said sub-scale aircraft is operated being selected such that peak overpressure generated by said sub-scale aircraft and time to rise to peak overpressure are the same as peak overpressure and time to rise to peak overpressure caused by operating the aircraft of interest at the operating point of interest.

7. A method for evaluating the acoustic signature produced by an aircraft of interest flying at a particular supersonic Mach number/altitude operating point of interest, the method comprising:

operating a sub-scale aircraft that is a sub-scale version of the aircraft of interest at a supersonic Mach number and at an altitude that are respectively different from the Mach number and the altitude associated with the operating point of interest, the Mach number and the altitude at which said sub-scale aircraft is operated being selected such that a first sonic parameter associated with operating the sub-scale aircraft and a second sonic parameter associated with operating the sub-scale aircraft are the same as corresponding first and second sonic parameters associated with operating the aircraft of interest at the operating point of interest; and evaluating the acoustic signature produced by the sub-scale aircraft.

8. A method for determining the Mach number and altitude at which to operate a sub-scale aircraft so as to emulate sonic attributes of a full-scale aircraft of interest flying at a supersonic operational point of interest, said method comprising:

generating a family of scaling maps with a scaling map being generated for each of a series of Mach number operational values, nodes on each scaling map each representing a specific combination of operational altitude and scale factor, one coordinate value of each node representing a first sonic parameter and another coordinate value of each node representing a second sonic parameter associated with the combination of altitude and scale factor represented by the specific node;

identifying on each of said scaling maps an operational match point having associated therewith a first sonic parameter value and a second sonic parameter value that are the same as corresponding first and second sonic parameter values associated with flying the aircraft of interest at the operational point of interest, and determining a combination of scale factor and operational altitude value associated with each operational match point;

using the combinations of scale factor/operational altitude values determined from the family of scaling maps, generating a curve of Mach as a function of scale factor and a curve of operational altitude as a function of scale factor; and using said curves, determining a Mach value and an altitude at which to operate the sub-scale aircraft based on the scale factor thereof.

9. A method for modeling the acoustic signature produced by an aircraft of interest flying at a particular supersonic Mach number/altitude operating point of interest, the method comprising:

operating a sub-scale aircraft that is a sub-scale version of the aircraft of interest at a supersonic Mach number and at an altitude that are respectively different from the Mach number and the altitude associated with the operating point of interest, the Mach number and the altitude at which said sub-scale aircraft is operated being selected such that a first sonic parameter associated with operating the sub-scale aircraft and a second sonic parameter associated with operating the sub-scale aircraft are the same as corresponding first and second sonic parameters associated with operating the aircraft of interest at the operating point of interest.

\* \* \* \* \*